US007196028B2

United States Patent
Ujita et al.

(10) Patent No.: US 7,196,028 B2
(45) Date of Patent: Mar. 27, 2007

(54) SLIDING DEVICE, FLUID DYNAMIC PRESSURE BEARING, AND MOTOR USING THE SAME

(75) Inventors: Jun Ujita, Satsumasendai (JP);
Kazuhide Kusano, Satsumasendai (JP);
Shunji Mikaki, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 111 days.

(21) Appl. No.: 11/139,025

(22) Filed: May 25, 2005

(65) Prior Publication Data
US 2005/0288171 A1    Dec. 29, 2005

(30) Foreign Application Priority Data
May 28, 2004  (JP) ............................. 2004-160090
Sep. 28, 2004  (JP) ............................. 2004-281698

(51) Int. Cl.
*F16C 17/00* (2006.01)
*C04B 35/117* (2006.01)
*C04B 35/56* (2006.01)

(52) U.S. Cl. .................. 501/127; 501/87; 384/100; 384/114

(58) Field of Classification Search ............. 501/87, 501/127; 384/100, 114
See application file for complete search history.

(56) References Cited

U.S. PATENT DOCUMENTS 5,413,850 A * 5/1995  Nehring ..................... 428/336
5,520,716 A * 5/1996  Takagi et al. ................ 75/235
2002/0159659 A1   10/2002 Ishikawa et al.

FOREIGN PATENT DOCUMENTS

| JP | 63-129061   | * | 1/1988  |
| JP | 03-075281   |   | 3/1991  |
| JP | 08-121467   |   | 5/1996  |
| JP | 08-152020   |   | 6/1996  |
| JP | 2000329141  | * | 11/2000 |
| JP | 2002-241172 |   | 8/2002  |

* cited by examiner

*Primary Examiner*—Karl Group
(74) *Attorney, Agent, or Firm*—Hogan & Hartson LLP

(57) ABSTRACT

The present invention provides sliding members respectively having sliding surfaces opposed to each other for creating dynamic pressure in a fluid, in which the sliding surfaces are formed of ceramics containing crystal grains of $Al_2O_3$, crystal grains of TiC contained in the crystal grains of $Al_2O_3$, and crystal grains of TiC existing independently of the crystal grains of $Al_2O_3$, and having a TiC content of 5 to 20 mass % in the total amount of $Al_2O_3$ and TiC, and the respective volume resistivity values $R_1$ and $R_2$ of the ceramics forming the sliding surfaces are within a range simultaneously satisfying equations (1) to (3) to prevent spark discharges from being induced between the sliding surfaces, and a fluid dynamic pressure bearing and a motor to which the configuration is applied:

$$10^6 \, \Omega\cdot cm < R_1 \leq 10^{12} \, \Omega\cdot cm \quad (1)$$

$$10^6 \, \Omega\cdot cm < R_2 \leq 10^{12} \, \Omega\cdot cm \quad (2)$$

$$|R_1 - R_2| \leq 10^5 \, \Omega\cdot cm \quad (3)$$

7 Claims, 9 Drawing Sheets

SLIDING DEVICE, FLUID DYNAMIC PRESSURE BEARING, AND MOTOR USING THE SAME

BACKGROUND OF THE INVENTION

The present invention relates to a sliding device, utilizing dynamic pressure of a fluid for lubrication, employed for computer peripherals, various types of industrial machinery and machine tools, and so forth, a fluid dynamic pressure bearing to which the configuration of the sliding device is applied, and a motor incorporating the fluid dynamic pressure bearing.

In recent years, a fluid dynamic pressure bearing utilizing dynamic pressure of a fluid for lubrication has been frequently used in place of a conventional roller bearing that is a combination of a rolling member (a ball, a roller, etc.) and a lubricant (lubricating oil, a grease, etc.) as a bearing in a computer peripheral, particularly a motor of a hard disk drive (HDD), a motor of a polygonal mirror composing a laser scanning system in a laser beam printer (LBP), or the like.

FIG. 11 is a cross-sectional view showing a state where a rotating member 1R is rotated in an example of a fluid dynamic pressure bearing 101. FIG. 12 is a perspective view showing the appearance of the fluid dynamic pressure bearing in a state shown in FIG. 11. FIG. 13 is a front view showing the appearance of a fixed member 1S comprising a shaft 102 and flanges 104 in the fluid dynamic pressure bearing 101. FIG. 14 is a plan view showing a sliding surface 104a of the flange 104.

Referring to FIGS. 11 to 13, the fluid dynamic pressure bearing 101 in this example comprises a pillar-shaped shaft 102, a cylindrical sleeve 103 having a through hole 103a, which is circular in cross section, through which the shaft 102 is inserted, and two disk-shaped flanges 104 fixed to both ends of the shaft 102 in such a manner that the sleeve 103 is interposed therebetween with the shaft 102 inserted through the through hole 103a of the sleeve 103.

The two flanges 104 are fixed to both ends of the shaft 102 in a state where the respective sliding surfaces 104a, which are side surfaces opposed to each other, are perpendicular to a central axis $X_2$ of the shaft 102.

The sleeve 103 is formed so that sliding surfaces 103b, which are both end surfaces to which the through hole 103a is opened, opposed to both the sliding surfaces 104a is perpendicular to a central axis $X_3$ of the sleeve 103.

When the fluid dynamic pressure bearing 101 is employed as a bearing in a motor of an HDD, for example, the shaft 102 and the two flanges 104 that are fixed to each other are used as a fixed member 1S with the shaft 102 and the flanges 4 fixed to a member on the fixed side such as a housing of a motor (not shown).

The sleeve 103 is used as a rotating member 1R rotated around a central axis $X_3$ with a member on the rotating side such as a rotor or a magnetic disk of a motor mounted thereon.

Referring to FIGS. 11 and 13, the sleeve 103 is formed such that a distance $L_3$ in the axial direction of the central axis $X_3$ between both the sliding surfaces 103b is slightly smaller than a distance $L_4$ in the axial direction of the central axis $X_2$ between the sliding surfaces 104a of the two flanges 104.

Referring to FIGS. 11 and 14, each of the sliding surfaces 104a of the two flanges 104 is formed as having a plurality of dynamic pressure creation grooves 104b in a herringbone shape for creating dynamic pressure in a thrust direction (a direction of the center axes $X_2$ and $X_3$) in a fluid such as gas or lubricating oil existing between the sliding surfaces 103b and 104a opposed to each other when the sleeve 103 is rotated.

Referring to FIGS. 11 and 13, the sleeve 103 is formed such that the inner diameter $D_3$ of the through hole 103a is slightly larger than the outer diameter $D_2$ of the shaft 102.

A sliding surface 102a, which is an outer peripheral surface of the shaft 102, is formed as having a plurality of dynamic pressure creation grooves 102b in a herringbone shape for creating dynamic pressure in a radial direction in a fluid existing between the sliding surface 102a and an opposed sliding surface 103c, which is an inner peripheral surface of the through hole 103a of the sleeve 103 when the sleeve 103 is rotated.

When the sleeve 103 serving as the rotating member 1R is rotated around the central axis $X_3$, dynamic pressure in a thrust direction is created in a fluid existing between the sliding surfaces 103b and 104a opposed to each other on each of the upper and lower sides in FIG. 11 of the sleeve 103 by the function of the dynamic pressure creation grooves 104b.

A clearance $G_{34}$ based on a dimensional difference between the distances $L_3$ and $L_4$ is created between the sleeve 103 and the flanges 104 on each of the upper and lower sides of the sleeve 103, as shown in FIG. 11, on the basis of the dynamic pressure, so that the sleeve 103 rises up to the fixed member 1S in a thrust direction.

In this rotating state, dynamic pressure in a radial direction is created over the whole peripheries of both the members 102 and 103 in a fluid existing between the sliding surfaces 102a and 103c opposed to each other by the function of the dynamic pressure creation grooves 102b.

A clearance $G_{23}$ based on a dimensional difference between the diameters $D_2$ and $D_3$ is created over the whole peripheries of both the members 102 and 103 on the basis of the dynamic pressure, so that the sleeve 103 also rises up to the fixed member 1S in a radial direction.

Therefore, the sleeve 103 serving as the rotating member 1R can be rotated in a state where it is lubricated by a fluid with which the clearances $G_{23}$ and $G_{34}$ are filled without being entirely brought into contact with the fixed member 1S. By significantly reducing its rotational resistance, therefore, it is possible to reduce a rotation torque produced by the motor as well as lengthen the bearing life.

In the fluid dynamic pressure bearing 101, the dynamic pressure of the fluid is low during a period from the start of rotation to the rotating state shown in FIGS. 11 and 12 and a period from the rotating state to the stop of the rotation. Therefore, the rotating member 1R is rotated in a state where the sliding surfaces 102a and 103c opposed to each other and the sliding surfaces 103b and 104a opposed to each other are respectively brought into direct contact with each other.

Therefore, it is preferable that in the sleeve 103 serving as the rotating member 1R and the shaft 102 and the flange 104 serving as the fixed member 1S, which constitute the fluid dynamic pressure bearing 101, at least the sliding surfaces 102a, 103b, 103c, and 104a of the members 102 to 104 are formed of ceramics in order to improve wear resistance.

When ceramics have insulating properties, however, the rotating member and the fixed member are charged by friction at the time of the rotation in a state where the sliding surfaces opposed to each other are brought into direct contact with each other, so that static electricity is liable to be stored in the fluid dynamic pressure bearing. When the static electricity is stored, a malfunction such as a write error or a read-out error of data may be liable to occur particularly in the HDD.

Both the rotating member and the fixed member composing the fluid dynamic pressure bearing are proposed to be formed or actually formed of conductive ceramics having a small volume resistivity value.

For example, Japanese unexamined patent publication No. 03-75281 (1991) discloses that metal powders are heat-treated in a nitrogen gas atmosphere and nitrided, and are chemically coupled to one another, to form a sliding component such as a bearing composed of conductive reaction sintering ceramics (a metal nitride) having a porosity of 5 to 30% and having a volume resistivity value of not more than $10^{-3}$ Ω·cm. It is considered that the configuration is applied to the fluid dynamic pressure bearing.

Japanese unexamined patent publication No. 08-121467 (1996) discloses that a rotating member and a fixed member are formed of ceramics mainly composed of $Al_2O_3$ and having a Young's modulus of not less than 300 GPa and having a volume resistivity value of not more than $10^6$ Ω·cm by containing not less than 20 mass % of TiC.

Japanese unexamined patent publication No. 08-152020 (1996) discloses that a rotating member and a fixed member are formed of ceramics mainly composed of an inorganic compound of at least one type selected from a group consisting of SiC, $Si_3N_4$, TiC, TiN, and $Al_2O_3$—TiC and having a volume resistivity value of not more than $10^6$ Ω·cm by containing 0.1 to 20 mass % of free carbon.

Furthermore, Japanese unexamined patent publication No. 2002-241172 discloses that a rotating member and a fixed member are formed of ceramics mainly composed of an inorganic compound of at least one type selected from a group consisting of $Al_2O_3$, $ZrO_2$, and TiN and having a volume resistivity value of not more than $10^6$ Ω·cm by containing a metal oxide, a metal nitride, a metal carbide, a metal boride, or a metal carbonitride each having a conductivity.

When the rotating member and the fixed member are formed of ceramics having a small volume resistivity value as disclosed in the references 1 to 4, however, spark discharges are liable to be induced between the sliding surfaces, opposed to each other, of the rotating member and the fixed member in a state where they are insulated from each other with a fluid such as gas or lubricating oil serving as an insulator interposed therebetween particularly when the rotating member is rotated, thereby making it impossible to continue to stably rotate the rotating member. This problem noticeably arises as the fluid dynamic pressure bearing is miniaturized in conformity with the miniaturization of equipment such as the HDD.

It is considered that this is caused, in handling or operating the equipment such as the HDD, for example, by direct application of a potential difference occurring between a member on the fixed side such as a housing of a motor to which the fixed member is fixed or a case of the HDD to which the housing is fixed and a member on the rotating side such as a rotor or a magnetic disc of the motor to a small clearance between respective sliding surfaces of both members opposed to each other through the rotating member and the fixed member having a small volume resistivity value.

When the equipment such as the HDD is, for example, transported or stored, a packaging material including a cushioning material having insulating properties such as expanded polystyrene is generally employed. In a case where the equipment is packaged by the packaging material and a case where it is taken out of the packaging material, friction is created between the cushioning material and the case of the equipment, whereby the case is liable to be charged.

A charging potential of the case is applied to the sliding surface of the fixed member through the housing of the motor and the fixed member having a small volume resistivity value. When the rotating member is rotated to cause a clearance between the sliding surfaces, opposed to each other, of the rotating member and the fixed member, a potential difference between the sliding surfaces is increased to induce spark discharges.

Even if the volume resistivity values of both members are made small, as described above, both members are still liable to be charged by friction in a state where both members are rotated with the sliding surfaces opposed to each other brought into direct contact with each other when the rotation of the rotating member is started or stopped. When the rotating member is further rotated in such a state where both members are changed to cause a clearance between the sliding surfaces, opposed to each other, of the rotating member and the fixed member, a potential difference between the sliding surfaces is increased to induce spark discharges.

When spark discharges are induced, an axis of rotation of the rotating member moves by a shock caused thereby, making the rotation unstable. Crystal grains at a portion where spark discharges are induced drop out to be particles. The particles enter a small clearance between the sliding surfaces opposed to each other and they are meshed with each other. This may cause the rotation of the rotating member to be further unstabilized or entirely stopped.

Furthermore, the generated particles may be scattered outward from the fluid dynamic pressure bearing through the clearance between the sliding surfaces and adhere to the inside of the equipment such as the HDD to cause a malfunction in the equipment, and electromagnetic waves generated by the spark discharges may induce a malfunction in the equipment.

In the fluid dynamic pressure bearing in which the rotating member and the fixed member are formed of ceramics having a small volume resistivity value, as described in the references 1 to 4, therefore, a measure to prevent spark discharges from being induced is taken by electrically connecting the rotating member and the fixed member to each other.

In recent years, under a mobile environment, the fluid dynamic pressure bearing has been more frequently employed. However, when the rotating member is instantaneously brought into contact with the fixed member while being rotated due to vibration applied to the equipment and is charged by friction, the rotation is stabilized and the rotating member and the fixed member are spaced apart from each other. This induces spark discharges in many recent cases. Therefore, a measure to prevent this problem is required to be taken.

SUMMARY OF THE INVENTION

An object of the present invention is to provide a sliding device capable of effectively restraining induction of spark discharges and generation of particles and electromagnetic waves caused thereby.

Another object of the present invention is to provide a fluid dynamic pressure bearing capable of restraining induction of spark discharges and generation of particles and electromagnetic waves caused thereby to stabilize the rotation of a rotating member as well as to prevent the particles from causing a malfunction by adhering to the inside of equipment and prevent the electromagnetic waves from inducing a malfunction in the equipment, and a motor incorporating the fluid dynamic pressure bearing.

A sliding device according to the present invention is characterized in that at least respective sliding surfaces, opposed to each other for creating dynamic pressure in a fluid, of at least two sliding members are formed of ceramics containing crystal grains of $Al_2O_3$, crystal grains of TiC contained in the crystal grains of $Al_2O_3$, and crystal grains of TiC existing independently of the crystal grains of $Al_2O_3$, and having a TiC content of 5 to 20 mass % in the total amount of $Al_2O_3$ and TiC, and the volume resistivity value $R_1$ of the ceramics forming one of the sliding surfaces and the volume resistivity value $R_2$ of the ceramics forming the other sliding surface are within a range simultaneously satisfying equations (1) to (3):

$$10^6 \, \Omega \cdot cm < R_1 \leq 10^{12} \, \Omega \cdot cm \quad (1)$$

$$10^6 \, \Omega \cdot cm < R_2 \leq 10^{12} \, \Omega \cdot cm \quad (2)$$

$$|R_1 - R_2| \leq 10^5 \, \Omega \cdot cm \quad (3)$$

In the present invention, the ceramics mainly composed of $Al_2O_3$ and containing TiC is used because the ceramics are a dense sintering member superior in wear resistance, has a high Young's modulus, can be processed with high precision, and allows chipping at the time of processing to be reduced.

In the ceramics, $Al_2O_3$ has insulating properties, while TiC has conductive properties. Therefore, the higher the content of TiC is, or the larger a continuous structure to be formed in the ceramics by the plurality of crystal grains of TiC is, the smaller the volume resistance value of the ceramics becomes. Conversely, the lower the content of TiC is, or the more discretely the crystal grains of TiC are dispersed without being continuous in the ceramics, the larger the volume resistivity value of the ceramics is liable to be.

In a case where the content of TiC in the total amount of $Al_2O_3$ and TiC exceeds 20 mass % and a case where all the crystal grains of TiC exist independently of the crystal grains of $Al_2O_3$ even if the content of TiC is within a range of 5 to 20 mass % (in this case, the crystal grains of TiC easily form a continuous large structure in the ceramics), the volume resistivity values $R_1$ and $R_2$ of the ceramics are not more than $10^6 \, \Omega \cdot cm$. Therefore, spark discharges are liable to be induced between the sliding surfaces opposed to each other, as previously described.

In a case where the content of TiC in the total amount of $Al_2O_3$ and TiC is less than 5 mass %, the volume resistivity values $R_1$ and $R_2$ of the ceramics exceed $10^{12} \, \Omega \cdot cm$. In the fluid dynamic pressure bearing, for example, therefore, the rotating member and the fixed member are charged by friction caused while the rotating member is rotated with the sliding surfaces opposed to each other brought into direct contact with each other. Thereafter, in a case where the sliding surfaces are spaced apart from each other by the dynamic pressure of the fluid, a potential difference occurs between the sliding surfaces, and spark discharges are liable to be induced.

Static electricity is stored in the fluid dynamic pressure bearing, so that malfunctions such as a write error and a read-out error of data are liable to occur particularly in an HDD.

Furthermore, in a case where in the ceramics forming the sliding surfaces opposed to each other, the content of TiC in the total amount of $Al_2O_3$ and TiC greatly differs and the distributed state of the crystal grains of TiC greatly differs so that a difference between the volume resistivity values $R_1$ and $R_2$ exceeds $10^5 \, \Omega \cdot cm$, the rotating member and the fixed member are charged by friction at the time of rotation with the sliding surfaces opposed to each other brought into direct contact with each other even if the volume resistivitiy values $R_1$ and $R_2$ are within a range satisfying the equations (1) and (2). Thereafter, when the sliding surfaces are spaced apart from each other by the dynamic pressure of the fluid, the sliding surface having the smaller volume resistivity value is more quickly discharged through a member on the fixed side or the rotating side electrically connected to each of the members, as compared with the sliding surface having the larger volume resistivity value. Therefore, a potential difference occurs between the sliding surfaces, and spark discharges are liable to be induced.

On the other hand, in the sliding device according to the present invention, the crystal grains of TiC contained in the ceramics forming at least the respective sliding surfaces of the sliding members such as the rotating member and the fixed member are classified into ones contained in the crystal grains of $Al_2O_3$ and ones existing independently of the crystal grains of $Al_2O_3$, to restrict the size of a structure, in which the crystal grains of TiC are continuous, formed in the ceramics as well as to control the content of TiC in the total amount of $Al_2O_3$ and TiC to 5 to 20 mass %.

Therefore, the volume resistivity values $R_1$ and $R_2$ of the ceramics forming the sliding surfaces opposed to each other are adjusted within a range simultaneously satisfying the equations (1) to (3), thereby making it possible to reliably prevent spark discharges from being induced by causing a potential difference between the sliding surfaces and prevent particles and electromagnetic waves from being generated by spark discharges.

That is, both the volume resistivity values $R_1$ and $R_2$ of the ceramics forming the sliding surfaces opposed to each other are set to values exceeding $10^6 \, \Omega \cdot cm$. When equipment such as an HDD is handled or operated, for example, a potential difference occurring between the respective sliding surfaces, opposed to each other, of the rotating member and the fixed member can be reduced by restraining application of a potential difference occurring between a member on the fixed side to which the fixed member is fixed and a member on the rotating side attached to the rotating member in the equipment to a small clearance between the respective sliding surfaces of both members through the rotating member and the fixed member.

In the ceramics having the above-mentioned crystal structure, the crystal grains of TiC having conductive properties are distributed, respectively, inside and outside of the crystal grains of $Al_2O_3$ having insulating properties, to form a conductive path.

Although formation of a large structure in which the crystal grains of TiC are continuous is restrained, to adjust the volume resistivity values $R_1$ and $R_2$ of the ceramics forming the sliding surfaces opposed to each other to a range higher than that in the conventional example, i.e., more than $10^6 \, \Omega \cdot m$ and not more than $10^{12} \, \Omega \cdot cm$, even if the crystal grains of $Al_2O_3$ are charged by friction at the time of rotation with the sliding surfaces opposed to each other brought into direct contact with each other, the charged crystal grains can be quickly discharged through a large number of crystal grains of TiC to remove electricity.

Consequently, the potential difference occurring when the sliding surfaces are spaced apart from each other can be reduced by restraining charging by friction in a case where the rotating member is rotated with both the sliding surfaces brought into direct contact with each other.

Furthermore, the difference between the volume resistivity values $R_1$ and $R_2$ of the ceramics forming the sliding surfaces opposed to each other is set to not more than $10^5$ $\Omega \cdot cm$. In a case where the sliding surfaces are spaced apart from each other, therefore, the potential difference between the sliding surfaces can be reduced by making the speeds at which electricity is discharged from the members approximately equal to each other.

According to the sliding device in the present invention, therefore, it is possible to reliably prevent spark discharges from being induced by the potential difference occurring between the sliding surfaces opposed to each other and to prevent particles and electromagnetic waves from being generated by spark discharges.

On the sliding surfaces composed of the ceramics having the above-mentioned crystal structure, both the crystal grains of TiC contained in the crystal grains of $Al_2O_3$ and the crystal grains of TiC existing independently of the crystal grains of $Al_2O_3$ can function as a solid lubricant.

In a case where the sliding device is a fluid dynamic pressure bearing, for example, by improving the sliding properties and the self-lubricating properties of the sliding surfaces, therefore, it is possible to continue to stably rotate the rotating member even in a state where the rotating member and the fixed member are brought into direct contact with each other in a case where the rotation of the rotating member is started or stopped and a case where vibration is applied to the equipment under a mobile environment.

Furthermore, a wear resistance in a case where the rotation of the rotating member is started can be reduced. Therefore, the rotation speed of the rotating member is quickly raised, thereby making it possible to make the rotating member promptly rise up from the fixed member.

Moreover, since the crystal grains of TiC are harder than the crystal grains of $Al_2O_3$, the wear of the crystal grains of $Al_2O_3$ can be restrained particularly by the function of the crystal grains of TiC contained in the crystal grains of $Al_2O_3$. That is, in a case where the crystal grains of $Al_2O_3$ are worn away, the crystal grains of TiC contained in the crystal grains of $Al_2O_3$ are exposed, to prevent the crystal grains of $Al_2O_3$ from being further worn away.

According to the present invention, therefore, the sliding members can be prevented from being worn away in a short time period by improving the wear resistance of the respective sliding surfaces of the members.

In a case where the content of TiC in the total amount of $Al_2O_3$ and TiC is less than 5 mass %, the above-mentioned function is not obtained, and the wear resistance of the ceramics is lowered. Therefore, the content of TiC is also limited to not less than 5 mass % from the viewpoint of the wear resistance of the ceramics.

Particularly in a sliding device employed under a hard use environment in which an environmental temperature becomes high or greatly varies, or vibration is violent, such as an HDD incorporated into a car navigation system of an automobile, however, the effect of lubrication by TiC cannot be sufficiently obtained, whereby the crystal grains of $Al_2O_3$ accounting for a large area percentage on the sliding surface may be rapidly worn away in a short time period.

This occurs because as the environmental temperature becomes higher, the respective amounts of thermal expansion of the rotating member and the fixed member composing the fluid dynamic pressure bearing serving as the sliding device become larger, and a clearance between the sliding surface, opposed to each other, of the members becomes smaller than a defined clearance, violent vibration is applied in this state, and the sliding surfaces are frequently brought into contact with each other with a strong contact force to increase friction between the sliding surfaces.

Therefore, particularly in the sliding device according to the present invention employed under the above-mentioned hard use environment, it is preferable that the sliding surface be defined by a surface of the crystal grains of $Al_2O_3$ in the ceramics, and at least a part of at least the crystal grains of TiC existing independently of the crystal grains of $Al_2O_3$ out of the crystal grains of TiC existing on the sliding surface be projected from the sliding surface.

In a state where the crystal grains of TiC existing independently of the crystal grains of $Al_2O_3$ are projected from the sliding surface defined by the surface of the crystal grains of $Al_2O_3$, the effect of providing good sliding properties and self-lubricating properties to the sliding surface by the TiC can be improved more than before.

Not only that, in a case where the projected crystal grains of TiC is made to serve as a spacer for maintaining a clearance between the sliding surfaces opposed to each other to start or stop the rotation of the rotating member and a case where vibration is applied to equipment under a mobile environment, the surfaces of the crystal grains of $Al_2O_3$ for respectively defining the sliding surfaces can be prevented from being brought into direct contact with each other to restrain the wear thereof.

Therefore, the life of the sliding device can be lengthened particularly by restraining the rapid wear of the crystal grains of $Al_2O_3$ under the above-mentioned hard use environment.

The rotation of the rotating member can be started in the same state as a state where the rotating member is raised by the projection height of the crystal grains of TiC from the fixed member. Therefore, the rotating member can be quickly made to rise up from the fixed member.

In the sliding device according to the present invention, it is preferable that at least a part of the crystal grains of TiC contained in the crystal grains of $Al_2O_3$ be also projected from the sliding surface, and the projection height $H_1$ thereof and the projection height $H_2$ of the crystal grains of TiC existing independently of the crystal grains of $Al_2O_3$ from the sliding surface be within a range satisfying an equation (4):

$$H_1 \leq H_2 \tag{4}$$

When the crystal grains of TiC contained in the crystal grains of $Al_2O_3$ are also projected from the sliding surface defined by the crystal grains of $Al_2O_3$, the life of the sliding device can be further lengthened by assisting the function of the crystal grains of TiC existing independently of the crystal grains of $Al_2O_3$ and projecting from the sliding surface by the crystal grains of TiC. When the projection height of the crystal grains of TiC included in the crystal grains of $Al_2O_3$ is defined within a range satisfying the equation (4), only the crystal grains of TiC existing independently of the crystal grains of $Al_2O_3$ can be prevented from being greatly projected in a case where the crystal grains of $Al_2O_3$ are worn away to restrain the wear and the drop thereof, for example.

In the sliding device according to the present invention, it is preferable that the maximum crystal grain diameter of the crystal grains of TiC contained in the crystal grains of $Al_2O_3$ be less than 1.0 μm, and the average crystal grain diameter of the crystal grains of TiC existing independently of the crystal grains of $Al_2O_3$ be 1.0 to 10.0 μm.

When the maximum crystal grain diameter of the crystal grains of TiC contained in the crystal grains of $Al_2O_3$ is less than 1.0 µm, the crystal grains of TiC can be more firmly contained in the crystal grains of $Al_2O_3$. Therefore, the effect of preventing the crystal grains of TiC from dropping out of the crystal grains of $Al_2O_3$ to serve as a solid lubricant by the crystal grains to improve the sliding properties and self-lubricating properties of the sliding surface and the effect of assisting the function of the crystal grains of TiC existing independently of the crystal grains of $Al_2O_3$ and projecting from the sliding surface can be maintained over a long time period.

Further, it is possible to prevent the crystal grains that have dropped out from being changed into particles to cause various problems previously described.

When the average crystal grain diameter of the crystal grains of TiC existing independently of the crystal grains of $Al_2O_3$ and projected from the sliding surface is set to 1.0 to 10.0 µm, the effect of providing good sliding properties and self-lubricating properties to the sliding surfaces by the crystal grains of TiC as well as maintaining a clearance between the sliding surfaces to function as a spacer for restraining the wear of the crystal grains of $Al_2O_3$ can be further improved.

By setting the average crystal grain diameter of the crystal grains to 1.0 to 10.0 µm to control the size of a structure, in which a plurality of crystal grains are continuous, formed in the ceramics, the volume resistivity value of the ceramics can be also adjusted within the above-mentioned range.

In the sliding device according to the present invention, it is preferable that the average crystal grain diameter of all the crystal grains composing the ceramics is 1.0 to 5.0 µm, and the minimum crystal grain diameter thereof is not less than 0.2 µm.

As described in the foregoing, a dynamic pressure creation groove for creating dynamic pressure is generally formed on the sliding surface of the sliding member. In order to form a predetermined clearance previously set by the dynamic pressure of a fluid between the sliding members opposed to each other, however, the dimensional precision of the dynamic pressure generation groove must be strictly controlled. Particularly when the sliding device such as the fluid dynamic pressure bearing is miniaturized in conformity with the miniaturization of the equipment such as the HDD, the dimensional precision of the dynamic pressure creation groove must be improved.

However, a sintering aids is generally hardly added to ceramics in which the average crystal grain diameter of all crystal grains is less than 1.0 µm. Therefore, a binding force between the crystal grains is weak. At the time of contact with the opposed sliding surface, drop of the crystal grains called chipping is easily generated particularly in an edge portion serving as a boundary line between an inner surface of the dynamic pressure creation groove and the sliding surface.

When the chipping is generated, the shape of the dynamic pressure creation groove is changed, so that a predetermined clearance previously set may not be caused by the dynamic pressure of the fluid between the sliding members opposed to each other. Further, the crystal grains that have dropped out by the chipping may be changed into particles to cause various problems previously described.

In a case where the minimum crystal grain diameter of all the crystal grains composing the ceramics is less than 0.2 µm, and the ceramics include minute crystal grains having a grain diameter of less than 0.2 µm, mechanical machinability is poor. In forming the dynamic pressure creation groove by cutting work on the sliding surface, for example, therefore, the chipping is easily generated.

When the chipping is generated, a processed surface is roughened. Therefore, the crystal grains are liable to drop out particularly in a case where the sliding surfaces opposed to each other are brought into contact with each other upon receipt of a shock when the rotating member is rotated. The crystal grains that have dropped out may be changed into particles to cause various problems previously described.

When the ceramics contain minute crystal grains having a grain diameter of less than 0.2 µm, the thermal conductivity thereof is liable to be reduced by the increase in a crystal grain boundary. Therefore, the heat radiation properties of each member composing the fluid dynamic pressure bearing are degraded, and the uniformity of temperature distribution is lowered. When an environmental temperature is changed, therefore, each member is thermally deformed nonuniformly so that the size of the clearance between the sliding members opposed to each other varies. Therefore, it may be impossible to stably continue to rotate the rotating member.

On the other hand, in a case where the average crystal grain diameter of all the crystal grains composing the ceramics exceeds 5.0 µm, machinability is improved so that chipping is not easily generated. Even if the sliding surface is polished, however, it is difficult to finish the surface into a mirror surface. Particularly when the sliding surface cannot be finished to a mirror surface, therefore, a predetermined clearance previously set may not be created by the dynamic pressure of the fluid between the sliding members opposed to each other.

A fluid dynamic pressure bearing according to the present invention is obtained by forming the respective sliding members composing the sliding device according to the present invention into a shape relatively rotatable around a common axis in a state where a clearance is created by dynamic pressure in a fluid between the sliding surfaces opposed to each other. By restricting induction of spark discharges and generation of particles and electromagnetic waves caused thereby, it is possible to stabilize the rotation of the rotating member out of the sliding members as well as to prevent the particles from causing a malfunction in equipment by adhering to the inside of the equipment and to prevent the electromagnetic waves from inducing a malfunction in the equipment.

A motor according to the present invention is one in which a clearance between the two sliding surfaces of the fluid dynamic pressure bearing according to the present invention is shielded from the air, and the clearance is filled with inert gas or gas substantially containing no water as a fluid. By restricting a change in quality of ceramics forming both the sliding surfaces, it is possible to improve reliability.

DETAILED DESCRIPTION OF THE INVENTION

Figure 1:
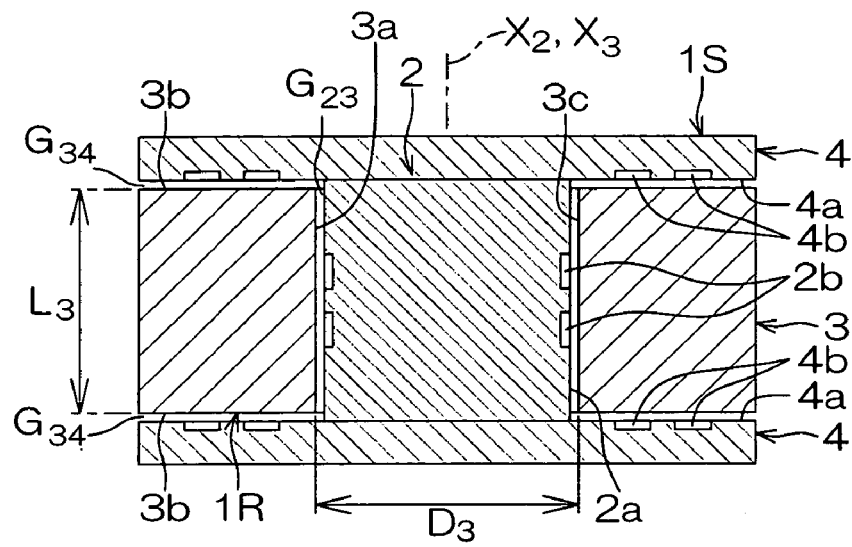
FIG. 1 is a cross-sectional view showing a state where a rotating member is rotated in a fluid dynamic pressure bearing serving as an example of an embodiment of a sliding device according to the present invention.
Figure 2:
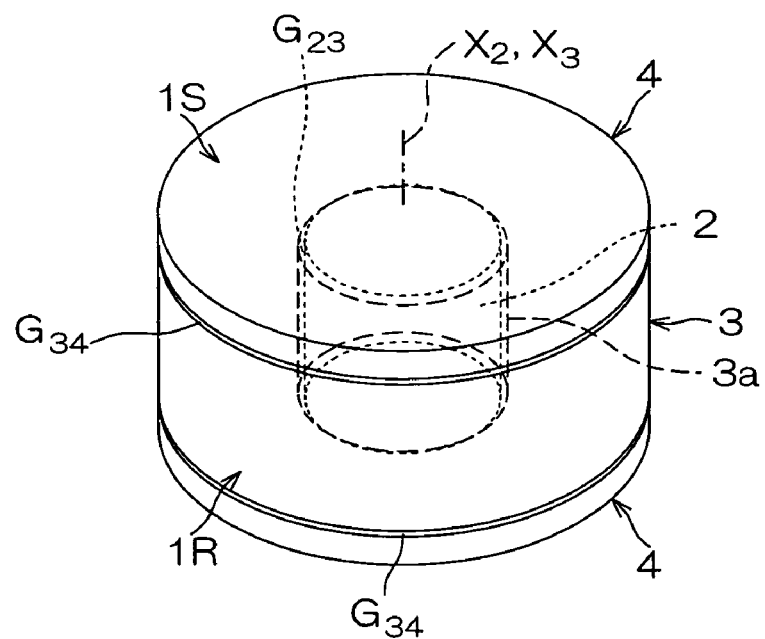
FIG. 2 is a perspective view showing the appearance of the fluid dynamic pressure bearing in a state shown in FIG. 1.
Figure 3:
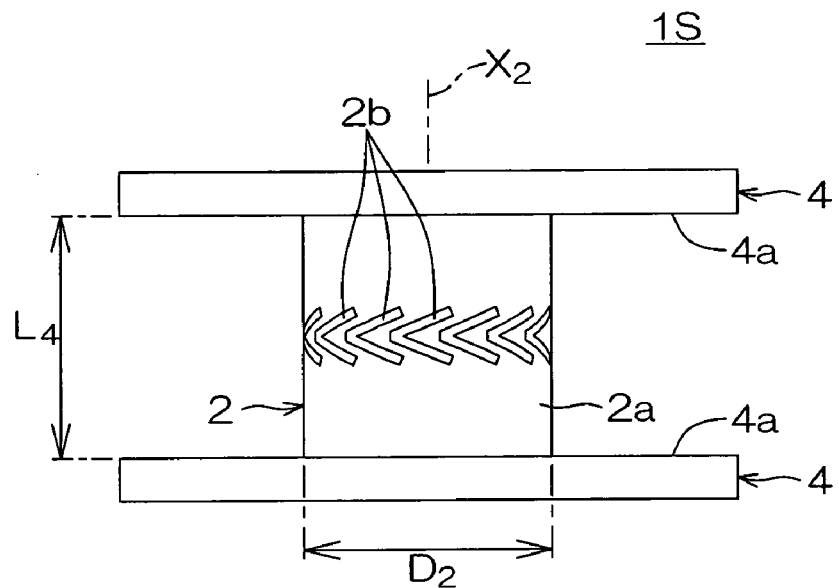
FIG. 3 is a front view showing the appearance of a fixed member comprising a shaft and flanges in the fluid dynamic pressure bearing.
Figure 4:
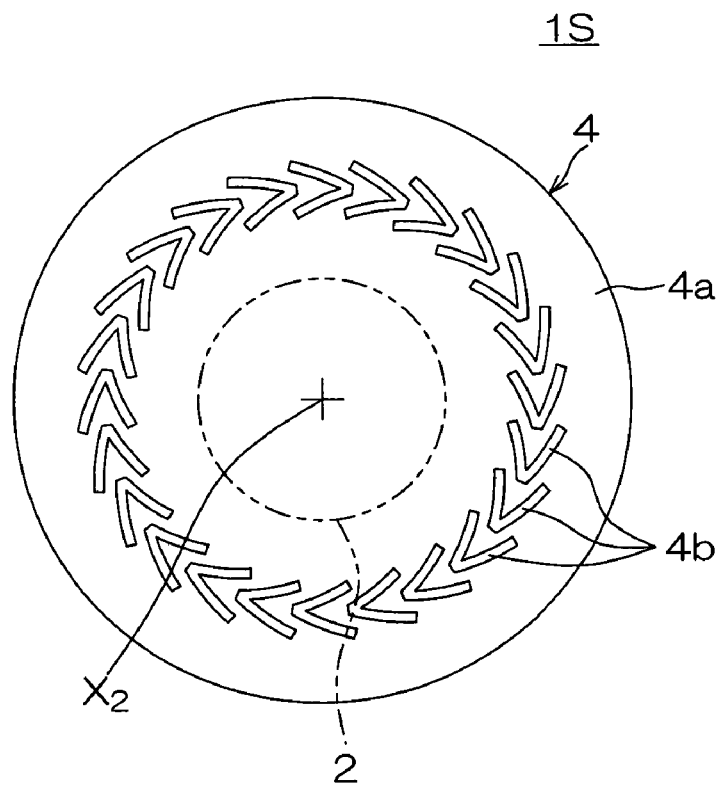
FIG. 4 is a plan view showing a sliding surface of a flange.

FIG. 1 is a cross-sectional view showing a state where a rotating member 1R is rotated in a fluid dynamic pressure bearing 1 serving as an example of an embodiment of a sliding device according to the present invention. FIG. 2 is a perspective view showing the appearance of the fluid dynamic pressure bearing 1 in a state shown in FIG. 1. FIG. 3 is a front view showing the appearance of a fixed member 1S comprising a shaft 2 and flanges 4 in the fluid dynamic pressure bearing 1. FIG. 4 is a plan view showing a sliding surface 4a of the flange 4.

Referring to FIGS. 1 to 3, the fluid dynamic pressure bearing 1 in this example comprises a pillar-shaped shaft 2, a cylindrical sleeve 3 having a through hole 3a, which is circular in cross section, through which the shaft 2 is inserted, and two disk-shaped flanges 4 fixed to both ends of the shaft 2 in such a manner that the sleeve 3 is interposed therebetween with the shaft 2 inserted through the through hole 3a of the sleeve 3.

The two flanges 4 are fixed to both ends of the shaft 2 by adhesion with adhesives, screwing, or the like in a state where the respective sliding surfaces 4a, which are side surfaces opposed to each other, are perpendicular to a central axis $X_2$ of the shaft 2. The sleeve 3 is formed so that sliding surfaces 3b, which are both end surfaces to which the through hole 3a is opened, opposed to both the sliding surfaces 4a are perpendicular to a central axis $X_3$ of the sleeve 3.

When the fluid dynamic pressure bearing 1 is employed as a bearing in a motor of an HDD, for example, the shaft 2 and the two flanges 4 that are fixed to each other are used as a fixed member 1S with the shaft 2 and the flanges 4 fixed to a member on the fixed side, such as a housing of a motor (not shown). The sleeve 3 is used as the rotating member 1R rotated around the central axis $X_3$ with a member on the rotating side, for example, a rotor or a magnetic disk of a motor mounted thereon.

Referring to FIGS. 1 and 3, the sleeve 3 is formed such that a distance $L_3$ in the axial direction of the central axis $X_3$ between the sliding surfaces 3b is slightly smaller than a distance $L_4$ in the axial direction of the central axis $X_2$ between the sliding surfaces 4a of the two flanges 4.

Referring to FIGS. 1 and 4, each of the sliding surfaces 4a of the two flanges 4 is formed as having a plurality of dynamic pressure creation grooves 4b in a herringbone shape for creating dynamic pressure in a thrust direction (a direction of the central axes $X_2$ and $X_3$) in a fluid such as gas or lubricating oil existing between the sliding surfaces 3b and 4a opposed to each other when the sleeve 3 is rotated.

Referring to FIGS. 1 and 3, the sleeve 3 is formed such that the inner diameter $D_3$ of the through hole 3a is slightly larger than the outer diameter $D_2$ of the shaft 2. A sliding surface 2a, which is an outer peripheral surface of the shaft 2, is formed as having a plurality of dynamic pressure creation grooves 2b in a herringbone shape for creating dynamic pressure in a radial direction in a fluid existing between the sliding surface 2a and an opposed sliding surface 3c, which is an inner peripheral surface of the through hole 3a, of the sleeve 3 when the sleeve 3 is rotated.

When the sleeve 3 serving as the rotating member 1R is rotated around the central axis $X_3$, dynamic pressure in a thrust direction is created in a fluid existing between the sliding surfaces 3b and 4a opposed to each other on each of the upper and lower sides in FIG. 1 of the sleeve 3 by the function of the dynamic pressure creation grooves 4b.

A clearance $G_{34}$ based on a dimensional difference between the distances $L_3$ and $L_4$ is created between the sleeve 3 and the flange 4 on each of the upper and lower sides of the sleeve 3, as shown in FIG. 1, on the basis of the dynamic pressure, whereby the sleeve 3 rises up to the fixed member 1S in a thrust direction.

In this rotating state, dynamic pressure in a thrust direction is created over the whole peripheries of the members 2 and 3 in a fluid existing between the sliding surfaces 2a and 3c opposed to each other by the function of the dynamic pressure creation grooves 2b.

A clearance $G_{23}$ based on a dimensional difference between the diameters $D_2$ and $D_3$ is created over the whole peripheries of the members 2 and 3 on the basis of the dynamic pressure, whereby the sleeve 3 also rises up to the fixed member 1S in a radial direction.

Therefore, the sleeve 3 serving as the rotating member 1R can be rotated in a state where it is lubricated by a fluid with which the clearances $G_{23}$ and $G_{34}$ are filled without being entirely brought into contact with the fixed member 1S. By significantly reducing its rotational resistance, therefore, it is possible to reduce a rotation torque produced by the motor as well as to lengthen the bearing life.

Although the respective specific sizes of the clearances $G_{23}$ and $G_{34}$ are not particularly limited, they are preferably 1 to 5 μm in the case of a small-sized fluid dynamic pressure bearing 1 incorporated into a motor of a small-sized HDD comprising a magnetic disk whose diameter is 3.5 inches or 2.5 inches, for example.

When the respective sizes of the clearances $G_{23}$ and $G_{34}$ are less than this range, high dynamic pressure is obtained. At the same time, the dimensional precision, the surface roughness, the assembling precision, and so forth of each of the members 2 to 4 must be managed with significantly high precision. Therefore, the productivity of the fluid dynamic pressure bearing 1 is reduced, so that the manufacturing cost may be high. In a case where the respective sizes of the clearances $G_{23}$ and $G_{34}$ exceed this range, sufficient dynamic pressure is not obtained when the rotating member 1R is rotated. Therefore, the central axes $X_2$ and $X_3$ are liable to move so that the rotation of the rotating member 1R may not be stabilized.

At least respective sliding surfaces of the shaft 2, the sleeve 3, and the flanges 4 in the fluid dynamic pressure bearing 1 are formed of ceramics mainly composed of $Al_2O_3$ and containing TiC. Specifically, the members 2 to 4 may be integrally formed of the ceramics as a whole or may have a composite structure in which a surface layer portion including each of the sliding surfaces 2a, 3b, 3c, and 4a is formed of the above-mentioned ceramics on a surface of a core material composed of a metal or other ceramics. Considering that the structure is simplified, however, it is preferable that the shaft 2, the sleeve 3, and the flange 4 be integrally formed of the above-mentioned ceramics as a whole.

Figure 5:
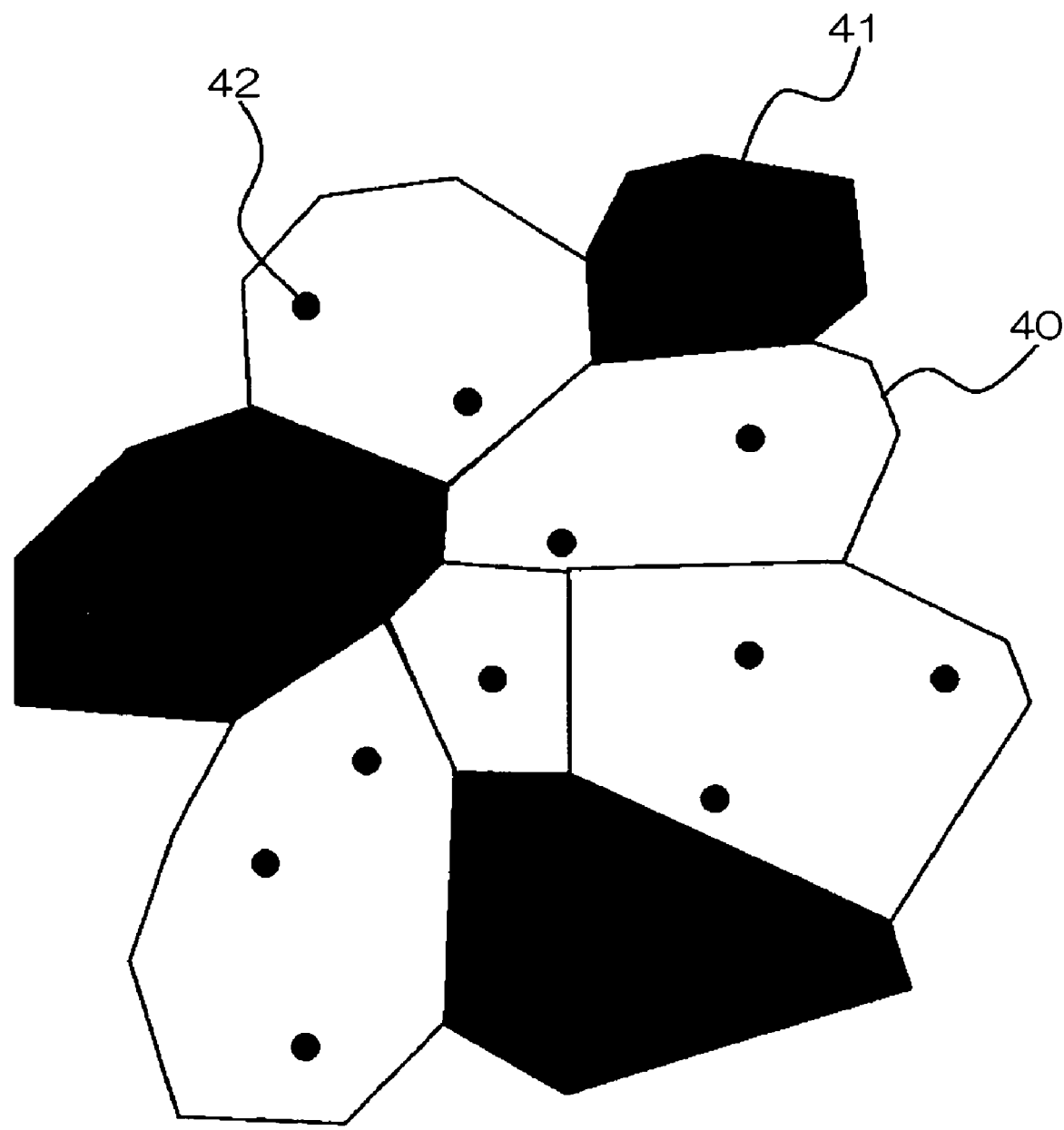
FIG. 5 is a diagram schematically showing an example of a crystal structure of ceramics forming a shaft, a sleeve, and a flange in the fluid dynamic pressure bearing shown in FIG. 1.

FIG. 5 is a diagram schematically showing an example of a crystal structure of the ceramics forming the shaft 2, the sleeve 3, and the flange 4.

Referring to FIG. 5, the ceramics forming each of the members 2 to 4 have a crystal structure containing crystal grains 40 of $Al_2O_3$, crystal grains 42 of TiC contained in the crystal grains 40 of $Al_2O_3$, and crystal grains 41 of TiC existing independently of the crystal grains 40 of $Al_2O_3$.

In the ceramics, the total content of TiC forming the crystal grains 41 and 42 is 5 to 20 mass % of the total amount of $Al_2O_3$ and TiC, and the respective volume resistivity values $R_1$ and $R_2$ of the sliding surfaces 2a and 3c opposed to each other and the sliding surfaces 3b and 4a opposed to each other are within a range simultaneously satisfying equations (1) to (3):

$$10^6 \, \Omega \cdot cm < R_1 \leq 10^{12} \, \Omega \cdot cm \quad (1)$$

$$10^6 \, \Omega \cdot cm < R_2 \leq 10^{12} \, \Omega \cdot cm \quad (2)$$

$$|R_1 - R_2| \leq 10^5 \, \Omega \cdot cm \quad (3)$$

It is possible to prevent wear, charging, and induction of spark discharges in a case where the rotating member is rotated in a state where the rotating member and the fixed member are brought into direct contact with each other, for example, a case where the rotation of the rotating member is started or stopped and a case where vibration is applied to equipment under a mobile environment by the mechanism previously described.

In order to further improve the effect of preventing a potential difference between the members on the rotating side and the fixed side from being directly applied to the sliding surfaces opposed to each other and preventing spark discharges from being induced by restraining charging of the rotating member and the fixed member in a case where the rotating member is rotated with both the sliding surfaces brought into direct contact with each other, it is preferable that the volume resistivity values $R_1$ and $R_2$ of the ceramics be particularly $10^7$ to $10^{11}$ $\Omega \cdot cm$ within a range defined by the equations (1) and (2).

In order to further improve the effect of preventing spark discharges from being induced by making the speeds at which the charged members are discharged approximately equal to each other in a case where the sliding surfaces opposed to each other are spaced apart from each other to reduce a potential difference between the spaced sliding surfaces, the difference between the volume resistivity values $R_1$ and $R_2$ is preferably the smallest possible amount in a range defined by the equation (3), and in particular, supposed to be 0 $\Omega \cdot cm$.

In the fluid dynamic pressure bearing, however, the rotating member may be discharge only to the air while being rising up to the fixed member. In this case, the volume resistivity value of the rotating member can be set to a value slightly lower by approximately $10^1$ to $10^3$ $\Omega \cdot cm$ than that of the fixed member in order to promote the discharging to gas.

In the specification, the volume resistivity values $R_{1\,and\,R2}$ Of the ceramics shall be represented by values measured in accordance with a measuring method printed in Japanese Industrial Standards JIS C2141:1992 "Testing methods of ceramic insulators for electrical and electronic applications". Further, the volume resistivity value that can be measured by the measuring method is not less than $10^2$ $\Omega \cdot cm$. Therefore, a volume resistivity value of less than $10^2$ $\Omega \cdot cm$ shall be represented by a value measured by a four-terminal method.

Figure 6:
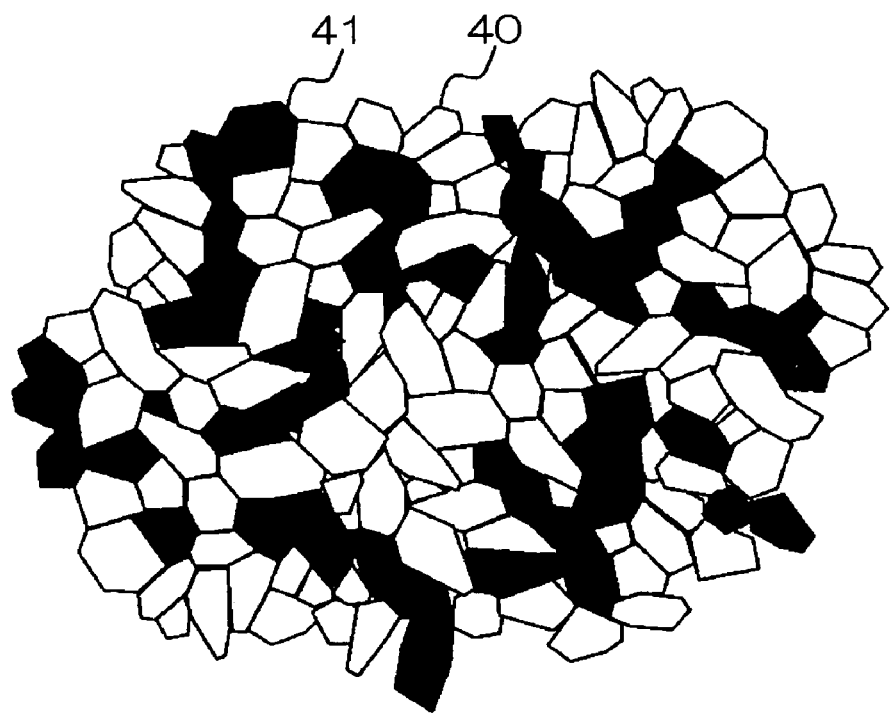
FIGS. 6 and 7 are diagrams schematically explaining examples of states where crystal grains of $Al_2O_3$ and crystal grains of TiC existing independently of the crystal grains of $Al_2O_3$ are distributed in the ceramics shown in FIG. 5, respectively.
Figure 7:
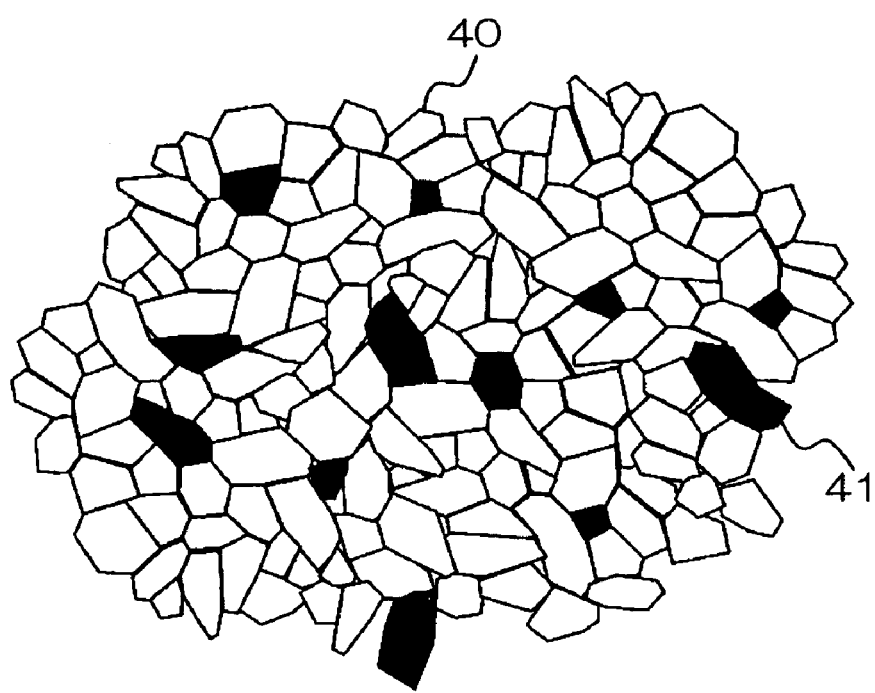

FIGS. 6 and 7 are diagrams for respectively schematically explaining examples of states where the crystal grains 40 of $Al_2O_3$ and the crystal grains 41 of TiC existing independently of the crystal grains 40 of $Al_2O_3$ are distributed in the ceramics shown in FIG. 5. The crystal grains 40 of $Al_2O_3$ include the crystal grains 42 of TiC, although the description thereof is omitted in both FIGS. 6 and 7.

Referring to FIGS. 6 and 7, the larger the content of TiC in the ceramics is, the lower the volume resistivity value of the ceramics is liable to be because the crystal grains 41 of TiC are connected to one another in the ceramics to form a continuous large structure (FIG. 6). Conversely, the smaller the content of TiC is, the higher the volume resistivity value of the ceramics is liable to be because the crystal grains 41 of TiC are dispersed not continuously but discretely in the ceramics (FIG. 7).

In the present invention, therefore, the size of a structure formed of the crystal grains 41 of TiC is adjusted, as previously described, to set the volume resistivity value of the ceramics in a range simultaneously satisfying the foregoing equations (1) to (3) and to limit the content of TiC in the total amount of $Al_2O_3$ and TiC to 5 to 20 mass % in order to improve the wear resistance of the ceramics.

The ceramics may contain other components such as a third ceramics component and a sintering aids in addition to $Al_2O_3$ and TiC. Examples of the sintering aids include various types of metal components conventionally known such as MgO, $ZrO_2$, $Y_2O_3$ and $Yb_2O_3$. Considering that a precise sintering member superior in wear resistance is formed, however, it is preferable that the ceramics contain not less than 50 mass % and particularly, not less than 60 mass % of $Al_2O_3$ in the total amount of the components composing the ceramics. For that purpose, it is preferable that the total mixture amount of the other components such as the third ceramics component and the sintering aids be not more than 60 mass parts per 100 mass parts of the total amount of $Al_2O_3$ and TiC.

In order to integrally form the shaft 2, the sleeve 3, and the flange 4 by the ceramics having the crystal structure shown in FIG. 5 as a whole, the grains of TiC having a large grain diameter approximately equal to that of the crystal grains 41 of TiC, grains of TiC having a small grain diameter approximately equal to that of the crystal grains 42 of TiC, grains of $Al_2O_3$ having a smaller grain diameter than that of the crystal grains 40 of $Al_2O_3$, and further the other components such as the third ceramics component and the sintering aids, if desired, are mixed in a predetermined proportion.

A solvent is then added to a mixture thus obtained, an aggregate of the grains is ground while mixed using a mill or the like, to prepare a slurry, a resin binder is added thereto, followed by drying, to prepare raw material powder of ceramics.

When the raw material powder is subjected to powder pressing or the like, to form the raw material powder into shapes of the shaft 2, the sleeve 3, and the flange 4, followed by firing, the sintering temperature of $Al_2O_3$ is lower than that of TiC, and the sintering speed of $Al_2O_3$ is higher than that of TiC. In the sintering step, therefore, in the process of repeatedly coupling the grains of $Al_2O_3$ so that the crystal grains 40 of $Al_2O_3$ grow, the grains of TiC having a small grain diameter are contained in the crystal grains 40 and are changed into the crystal grains 42 of TiC.

When the final grain diameter of the crystal grains 40 of $Al_2O_3$ is set to a grain diameter that is approximately equal to that of the grains of TiC having a large grain diameter to sinter the crystal grains 40 of $Al_2O_3$, the grains of TiC having a large grain diameter are not accepted in the crystal grains 40 of $Al_2O_3$, although they are sintered with the crystal grains 40 that have grown but remain in an independent state to be crystal grains 41 of TiC.

Therefore, the shaft 2, the sleeve 3, and the flange 4 can be integrally formed of the ceramics having the crystal structure shown in FIG. 5.

In the above-mentioned manufacturing method, the mixture ratio of the two types of grains of TiC and the grains of $Al_2O_3$ serving as raw materials almost coincides with the content of TiC in the total amount of $Al_2O_3$ and TiC. In order to adjust the content of TiC in a range of 5 to 20 mass %, as previously described, therefore, the mixture ratio of the two types of TiC in the total amount of the two types of grains of TiC and the grains of $Al_2O_3$ may be 5 to 20 mass %.

The existence ratio of the crystal grains 41 and 42 of TiC can be adjusted by changing the mixture ratio of the two types of grains of TiC. A range of the mixture ratio of the two types of grains of TiC that define the existence ratio of the crystal grains 41 and 42 of TiC is not particularly limited. Considering that both functions of the two types of crystal grains 41 and 42 of TiC in the ceramics having the crystal structure shown in FIG. 5 are satisfactorily exhibited, however, it is preferable that the mixture ratio be 5/95 to 95/5 in terms of the ratio $W_1/W_2$ of the mass $W_1$ of the grains of TiC having a large grain diameter in which the crystal grains 41 originate to the mass $W_2$ of the grains of TiC having a small grain diameter in which the crystal grains 42 originate.

In a case where the content of TiC is found from the shaft 2, the sleeve 3, and the flange 4 that have already been manufactured, after elements contained in the ceramics are specified by fluorescent X-ray analysis, and the crystal phase of each of the elements is identified by X-ray diffraction to confirm that $Al_2O_3$ and TiC exist, quantitative analysis of the elements may be made by fluorescent X-ray analysis to find the contents of Al and Ti, and the content of TiC in the total amount of $Al_2O_3$ and TiC may be calculated from the results.

In the present invention, it is preferable that the respective sliding surfaces 2a, 3b, 3c, and 4a of the shaft 2, the sleeve 3, and the flange 4 be defined by a surface 40a of the crystal grains 40 of $Al_2O_3$, and at least the crystal grains 41 of TiC out of the two types of crystal grains 41 and 42 of TiC existing on the sliding surfaces 2a, 3b, 3c, and 4a be projected from the sliding surfaces 2a, 3b, 3c, and 4a.

When the fluid dynamic pressure bearing 1 is thus constructed, the life thereof can be lengthened by providing good sliding properties and self-lubricating properties to the sliding surfaces 2a, 3b, 3c, and 4a using the function of the projected crystal grains 41 of TiC as well as by restraining the wear of the crystal grains 40 of $Al_2O_3$, and the rotating member 1R can be made to quickly rise up from the fixed member 1S when the rotation of the rotating member 1R is started.

Figure 8:
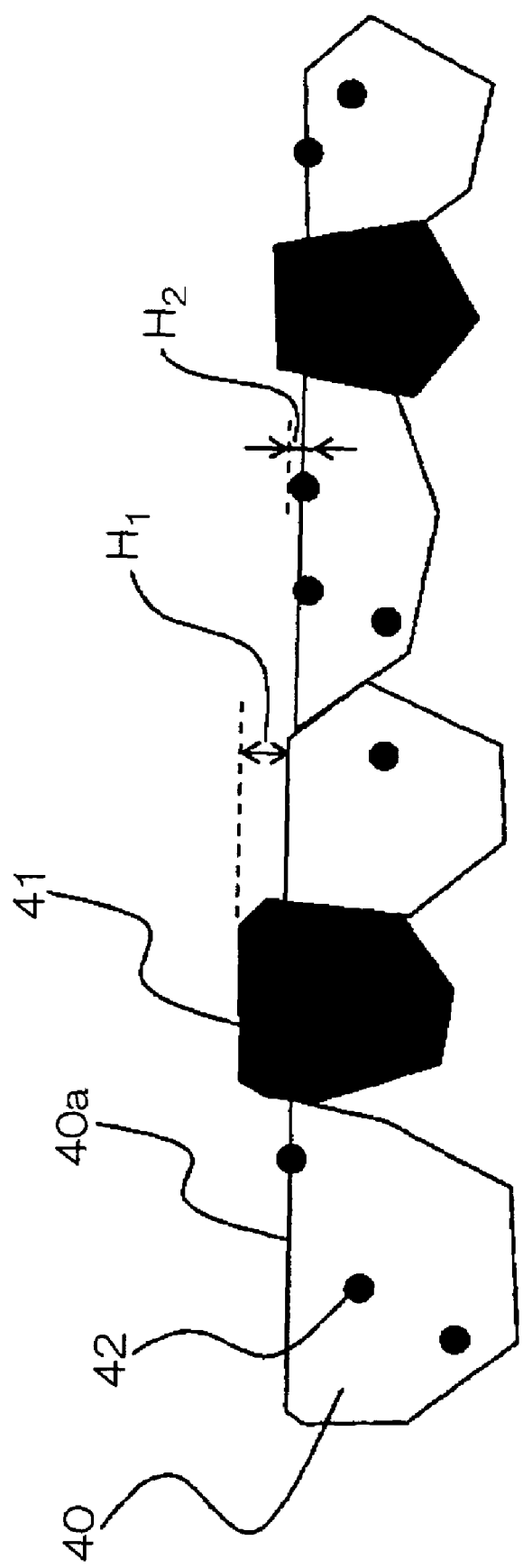
FIG. 8 is a diagram schematically showing an example of a crystal structure of ceramics on respective sliding surfaces of the shaft, the sleeve, and the flange in the fluid dynamic pressure bearing shown in FIG. 1.

FIG. 8 is a diagram schematically showing an example of the crystal structure of the ceramics on each of sliding surfaces of the shaft 2, the sleeve 3, and the flange 4.

Referring to FIG. 8, both two types of crystal grains 41 and 42 existing on each of the sliding surfaces 2a, 3b, 3c, and 4a defined by the surface 40a of the crystal grains 40 of $Al_2O_3$ are projected from the sliding surface 2a, 3b, 3c, or 4a in this example.

When the crystal grains 42 of TiC are also thus projected from the sliding surface 2a, 3b, 3c, or 4a, the life of the fluid dynamic pressure bearing 1 can be further lengthened by assisting the above-mentioned function of the crystal grains 41 of TiC.

In order to project the crystal grains 41 and 42 of TiC from the sliding surface 2a, 3b, 3c, or 4a, it is preferable to utilize a difference in polishing speed due to a difference in hardness between $Al_2O_3$ and TiC.

That is, when the sliding surfaces 2a, 3b, 3c, and 4a composed of the ceramics in which the crystal grains of $Al_2O_3$ and TiC are mixed with each other are polished by buff polishing, barrel polishing, ion milling, etc. in a short time period as finish after firing, the crystal grains of $Al_2O_3$ are polished faster and more greatly than the crystal grains of TiC because the hardness of $Al_2O_3$ is 2100 to 2300 GPa, while the hardness of TiC is 2800 to 3200 GPa.

Therefore, the crystal grains 41 and 42 of TiC can be projected from each of the sliding surfaces 2a, 3b, 3c, and 4a defined by the surface 40a of the crystal grains 40 of $Al_2O_3$, as shown in FIG. 8.

It is preferable that the projection height $H_1$ of the crystal grains 41 of TiC and the projection height $H_1$ of the crystal grains 42 of TiC satisfy the following equation (4):

$$H_1 \leq H_2 \qquad (4)$$

For that purpose, the grain diameter of the crystal grains 42 of TiC may be smaller than the grain diameter of the crystal grains 41 of TiC. Particularly, it is preferable that the maximum crystal grain diameter of the crystal grains 42 of TiC is less than 1.0 μm, and the average crystal grain diameter of the crystal grains 41 of TiC is 1.0 to 10.0 μm.

As apparent from the mechanism of firing described in the previous manufacturing method, the grain diameter of each of the crystal grains 41 and 42 of TiC almost coincides with the grain diameter of its original TiC. In order to set the maximum crystal grain diameter of the crystal grains 42 to less than 1.0 μm, the grain diameter of its original grains of TiC may be set to less than 1.0 μm. In order to set the average crystal grain diameter of the crystal grains 41 to 1.0 to 10.0 μm, the grain diameter of its original grains of TiC may be set to 1.0 to 10.0 μm.

As described in the foregoing, the respective projection heights of the crystal grains 41 and 42 can be set in a range satisfying the equation (4) by defining the grain diameters of both the crystal grains 41 and 42.

The crystal grains 42 can be prevented from dropping out by setting the maximum crystal grain diameter of the crystal grains 42 to less than 1.0 μm to more firmly include the crystal grains 42 in the crystal grains 40 of $Al_2O_3$, as previously described, and the above-mentioned effect produced by projecting the crystal grains 41 of TiC can be also further improved by setting the average crystal grain diameter of the crystal grains 41 to 1.0 to 10.0 μm.

In order to set the maximum crystal grain diameter of the crystal grains 42 of TiC to not less than 1.0 μm, the grain diameter of its original grains of TiC must be set to not less than 1.0 μm. In order that the grains of TiC may be included in the crystal grains 40 of $Al_2O_3$ to be the crystal grains 42 by the above-mentioned manufacturing method, therefore, the crystal grains 40 of $Al_2O_3$ must be grown until they become significantly large, and a void occurring in the ceramics is increased, so that the strength of each of the members 2 to 4 is liable to be reduced.

On the other hand, if the maximum crystal grain diameter of the crystal grains 42 of TiC is less than 1.0 μm, the grain diameter of its original grains of TiC can be set to less than 1.0 μm. Therefore, the strength of each of the members 2 to 4 can be improved by setting the crystal grain diameter of the crystal grains 40 of $Al_2O_3$ to 2 to 8 μm, for example.

In order to set the average crystal grain diameter of the crystal grains 41 of TiC to less than 1.0 μm, its original grains of TiC must be set to less than 1.0 μm, so that a difference in the grain diameter between the original grains of TiC and grains in which the crystal grains 42 originate becomes unclear. In the manufacturing method previously described, therefore, few crystal grains 41 exist independently without being included in the crystal grains 40 of $Al_2O_3$, so that the ceramics forming the members 2 to 4 may not be able to be formed into the crystal structure shown in FIG. 5.

On the other hand, if the average crystal grain diameter of the crystal grains 41 of TiC is not less than 1.0 μm, its original grains of TiC is set to not less than 1.0 μm, so that a difference in the grain diameter between the original grains of TiC and grains in which the crystal grains 42 originate is made clear, thereby making it possible to prevent the crystal grains 41 of TiC from being included in the crystal grains 40 of $Al_2O_3$ to form the ceramics forming the members 2 to 4 into the crystal structure shown in FIG. 5 in the manufacturing method previously described.

In order to set the average crystal grain diameter of the crystal grains 41 of TiC to a value exceeding 10.0 μm, the grain diameter of its original grains of TiC must be set to a value exceeding 10.0 μm. Therefore, sintering properties with the crystal grains 40 of $Al_2O_3$ are significantly degraded to cause a large number of voids. Therefore, the strength of each of the members 2 to 4 is liable to be reduced.

On the other hand, if the average crystal grain diameter of the crystal grains 41 of TiC is less than 10.0 μm, the grain diameter of its original grains of TiC can be set to not more than 10.0 μm, thereby allowing good sintering with the crystal grains 40 of $Al_2O_3$. Therefore, the strength of each of the members 2 to 4 can be improved.

In the present invention, it is preferable that the average crystal grain diameter of all the crystal grains composing the ceramics is 1.0 to 5.0 μm, and the minimum crystal grain diameter thereof is not less than 0.2 μm, as described above. For that purpose, the grain diameters of the grains of $Al_2O_3$ and the two types of grains of TiC in which the crystal grains originate, the type and the content of the sintering aids, the firing conditions, and so forth may be adjusted.

In order for the ceramics not to contain minute crystal grains having a grain diameter of less than 0.2 μm, one of effective methods is a method of filtering a slurry using a ultrafiltration membrane, for example, during the production of its original raw material powder, previously described, to remove minute components having a grain diameter of less than 0.2 μm.

According to this method, it is unnecessary to select the grains of each of the components and strictly manage the firing temperature, for example. Therefore, the productivity of the raw material powder and thus, each of the members 2 to 4 formed using the raw material powder can be improved.

It is preferable that the average grain diameter of the grains of TiC in which the crystal grains 42 of TiC originate be within a range of less than 1.0 μm and particularly, 0.3 to 0.7 μm. It is preferable that the average grain diameter of the grains of TiC in which the crystal grains 41 of TiC originate be within a range of 1.0 to 10.0 μm and particularly, 1.0 to 5.0 μm. Further, it is preferable that the average grain diameter of the grains of $Al_2O_3$ in which the crystal grains 40 of $Al_2O_3$ originate be the same as or less than that of the grains of TiC in which the crystal grains 42 originate and particularly, 0.5 to 0.9 μm.

In order to more accurately find the respective grain diameters of the crystal grains 40 of $Al_2O_3$ and the crystal grains 41 and 42 of TiC in the ceramics forming the shaft 2, the sleeve 3, and the flange 4, it is preferable that a tissue photograph be taken using a transmission electron microscope (TEM), and the grain diameter of each of the crystal grains 40 to 42 reflected on the photograph be measured. From the results of the measurement, the average crystal grain diameter of the crystal grains 41 of TiC, the maximum crystal grain diameter of the crystal grains 42, and the average crystal grain diameter and the minimum crystal grain diameter of all the crystal grains composing the ceramics may be calculated.

A motor according to the present invention incorporates the above-mentioned fluid dynamic pressure bearing 1 in a state where the respective clearances $G_{23}$ and $G_{34}$ between the sliding surfaces 2a and 3c opposed to each other and between the sliding surfaces 3b and 4a opposed to each other are shielded from the air, and the clearances $G_{23}$ and $G_{34}$ are filled with inert gas or gas substantially containing no water as a fluid, thereby making it possible to restrain movement of rotation by spark discharges and generation of electromagnetic waves and particles. Therefore, the above-mentioned motor can be suitably employed particularly for electronic equipment such as an HDD having few linkings.

The configuration of the present invention is not limited to that in the example shown in the drawings described above.

When the fluid dynamic pressure bearing 1 in the example shown in FIGS. 1 to 4 is employed for a motor of a polygonal mirror composing a laser scanning system in an LBP, the sleeve member 3 can be used as a fixed member by being fixed to a housing or the like of the motor (not shown), and the shaft member 2 and the two thrust members 4 can be used as a rotating member rotated around the central axis $X_2$ by mounting a polygonal mirror on one of the two thrust members 4.

Although in the example shown in FIGS. 1 to 4, the two flanges 4 are respectively formed separately from the shaft 2 and are fixed to both of its ends, one of the flanges 4 can be also formed integrally with the shaft 2.

Furthermore, each of the sections composing the fluid dynamic pressure bearing 1 can be suitably changed depending on the shape and the structure of the fluid dynamic pressure bearing 1.

The configuration of the present invention is not limited to the fluid dynamic pressure bearing. For example, it is applicable to various types of sliding devices lubricantly utilizing the dynamic pressure of a fluid.

In addition thereto, various design changes can be made without departing from the scope of the present invention.

EXAMPLES

Examples 1 to 7, Comparative Examples 1 to 6

Three types of grains, described below, and each of components MgO, $ZrO_2$, $Y_2O_3$, and $Yb_2O_3$ serving as a sintering aids were mixed, to prepare a mixture in which ceramics forming the shaft 2, the sleeve 3, and the flange 4 in the fluid dynamic pressure bearing 1 shown in FIGS. 1 to 4.

Grains of $Al_2O_3$: an average grain diameter of 0.5 μm, a purity of not less than 99%

Grains of TiC having a large grain diameter: an average grain diameter of 3 μm, a purity of not less than 98% Grains of TiC having a small grain diameter: an average grain diameter of 0.6 μm, a purity of not less than 98%

The mixture ratio of the two types of grains of TiC was set to 50/50 in terms of the ratio $W_1/W_2$ of the mass $W_1$ of the grains of TiC having a large grain diameter to the mass $W_2$ of the grains of TiC having a small grain diameter.

The mixture ratio of the grains of $Al_2O_3$ and the two types of grains of TiC was so adjusted that the content (mass %) of the total amount of the two types of grains of TiC in the total amount of the three types of grains was a value shown in Table 1.

The mixture ratio of the sintering aids was so adjusted that the total amount of the above-mentioned components was 0.1 to 15 parts by mass per 100 parts by mass of the total amount of the three types of grains. More specifically, the higher the mixture ratio of the two types of grains of TiC that were higher in sintering temperature and were lower in sintering speed than the grains of $Al_2O_3$ was, the larger the amount of the sintering aids to be mixed was.

A solvent was added to the mixture, an aggregate of the grains were ground while mixed using a mill, to prepare a slurry, a resin binder was added to the slurry, followed by drying, to prepare raw material powder of ceramics. After the raw material powder was formed into the shapes of the shaft 2, the sleeve 3, and the flange 4 using a mechanical pres, was put in a vacuum furnace, and was fired at a temperature of 1600 to 1800° C., a surface including its sliding surface was finished to a mirror surface, to manufacture the members 2 to 4.

On the sliding surface 2a serving as an outer peripheral surface of the shaft 2 and the sliding surface 4a serving as a side surface of the flange 4, a plurality of dynamic pressure creation grooves 2b and 4b in a herringbone shape are respectively formed by blast processing.

The shaft 2 and the sleeve 3 the respective diameters $D_2$ and $D_3$ of which were adjusted such that a clearance $G_{23}$ created between the sliding surfaces 2a and 3c, opposed to each other, of the shaft 2 and the sleeve 3 was a value shown in Table 1 were prepared for each of the examples and the comparative examples. A clearance $G_{34}$ created between the respective sliding surfaces 3b and 4a, opposed to each other, of the sleeve 3 and the flange 4 was always made constant.

Comparative Examples 7 to 13

The shaft 2, the sleeve 3, and the flange 4 were manufactured in the same manner as in the examples 1 to 7 and the comparative examples 1 to 6 except that two types of grains, described below, were used in place of the three types of grains.

Grains of $Al_2O_3$: an average grain diameter of 1 μm, a purity of not less than 99% Grains of TiC: an average grain diameter of 1.5 μm, a purity of not less than 98%

The mixture ratio of the two types of grains was so adjusted that the content (mass %) of the grains of TiC in the total amount of the two types of grains was a value shown in Table 1.

The following tests were conducted with respect to each of the members 2 to 4 manufactured in the examples and the comparative examples, to evaluate the properties thereof.

Measurement of Volume Resistivity Value:

A measuring sample was cut out from the shaft 2, and its volume resistivity value (Ω·cm) was measured using a DC power supply (PAB110-0.6 manufactured by KIKUSUI Electronics Corp.), an ammeter (34401A manufactured by Hewlett-Packard Company), and a voltmeter (7561 manufactured by Yokogawa Electric Corp.).

Observation of Crystal Structure:

A measuring sample was cut out from the shaft 2, and its surface was heated to 1450 to 1700° C. under vacuum and subjected to fire-etching in order to make it easy to see a crystal grain boundary, and was then observed using a scanning electron microscope (SEM, JSM-6700F manufactured by JEOL.Ltd) in a state where carbon was deposited.

The measuring sample in a case where the crystal grains 42 of TiC was contained in the crystal grains 40 of $Al_2O_3$, and the crystal grains 41 of TiC existed independently of the crystal grains 40 of $Al_2O_3$, as shown in FIG. 5, was evaluated as "good (o)", and the measuring sample in a case where the crystal grains 41 of TiC exists independently of the crystal grains 40 of $Al_2O_3$, but the crystal grains 42 of TiC was not contained in the crystal grains 40 of $Al_2O_3$ was evaluated as "bad (X)".

In the examples 1 to 7 and the comparative examples 1 to 13, the shaft 2, the sleeve 3, and the flange 4 were fired under the same conditions using the same raw material powder, and it was considered that the three members 2 to 4 had the same volume resistivity value and had the same crystal structure. Therefore, the above-mentioned measurements were made with respect to the shaft 2.

Rotation Test (I):

The shaft 2, the sleeve 3, and the flange 4 were assembled, as shown in FIGS. 1 to 4, and the shaft 2 and the flange 4 were fixed to the housing of the motor, to constitute the fixed member 1S. Further, the rotor of the motor was mounted on the sleeve 3, to constitute the rotating member 1R.

The motor was energized to start the rotation of the rotating member 1R and continue the rotation for a predetermined time period in a state where the rotating member 1R rose up to the fixed member 1S, and the energization was then stopped to stop the rotation of the rotating member 1R, to observe the respective sliding surfaces 2a and 3c, opposed to each other, of the shaft 2 and the sleeve 3 using the above-mentioned SEM as well as to determine whether or not an oxide of Ti was produced by X-ray diffraction.

When spark discharges were induced, it was observed that a part of crystal grains composing the sliding surfaces 2a and 3c dropped out by a shock caused thereby, and a part of TiC existing in the vicinity of the sliding surfaces 2a and 3c was oxidized, to produce an oxide of Ti.

Therefore, the measuring sample in a case where a trace of drop of the crystal grains was not found on the sliding surfaces 2a and 3c observed by the SEM, and it was confirmed that no oxide of Ti was produced by X-ray diffraction was evaluated as "good (○, no spark discharges were induced)", and the measuring sample in a case where a trace of drop of crystal grains was found, or it was confirmed that an oxide of Ti was produced was evaluated as "bad (X, spark discharges were induced)".

Rotation Test (II):

The shaft 2, the sleeve 3, and the flange 4 were assembled, as shown in FIGS. 1 to 4, and the shaft 2 and the flange 4 were fixed to the housing of the motor, to constitute the fixed member 1S. Further, the rotor of the motor was mounted on the sleeve 3, to constitute the rotating member 1R.

After operations for energizing the motor to start the rotation of the rotating member 1R to make the rotating member 1R rise up to the fixed member 1S as well as stopping the energization immediately after that to stop the rotation of the rotating member 1R were repeatedly performed 50000 times, the respective sliding surfaces 2a and 3c, opposed to each other, of the shaft 2 and the sleeve 3 were observed using the above-mentioned SEM.

The arithmetic mean roughness $R_a$, defined in Japanese Industrial Standards JIS B0601$_{-1994}$ "Surface roughness-Definitions and designation", of each of the sliding surfaces 2a and 3c was found. The sliding surfaces 2a and 3c before performing the rotation test were previously polished such that their respective arithmetic mean roughnesses $R_a$ were not more than 0.15 μm.

The measuring sample in a case where a flaw or a trace of drop of crystal grains was not found at all on the sliding surfaces 2a and 3c observed by the SEM, and the arithmetic mean roughness $R_a$ was not more than 0.15 μm was evaluated as "excellent (◎)", the measuring sample in a case where a flaw or a trace of drop of crystal grains was found on parts of the sliding surfaces 2a and 3c, and the arithmetic mean roughness $R_a$ was more than 0.15 μm and less than 0.3 μm was evaluated as "good (○)", and the measuring sample in a case where a large number of flaws or traces of drop of crystal grains were found on the whole sliding surfaces, and the arithmetic mean roughness $R_a$ was not less than 0.3 μm was evaluated as "bad (X)".

Furthermore, as comprehensive evaluation, the measuring sample in a case where all the evaluations in the rotation test (I) were good (○) and all the evaluations in the rotation test (II) were excellent (◎) was evaluated as "excellent (◎)", the measuring sample in a case where all evaluations in the rotation test (I) were "good (○)" and evaluations in the rotation test (II) were excellent (◎) or good (○) were evaluated as "good (○)", and the measuring sample in a case where any of the evaluations in the rotation tests was bad (X) was evaluated as "bad (X)".

Results are shown in Table 1 to 3. In each of the tables, a numeral in a column for a clearance $G_{23}$ means that the clearance is as follows:

0.7–1: not less than 0.7 μm and less than 1 μm
1–2: not less than 1 μm and less than 2 μm
2–3: not less than 2 μm and less than 3 μm
3–4: not less than 3 μm and less than 4 μm
4–5: not less than 4 μm and less than 5 μm
5–6: not less than 5 μm and less than 6 μm
6–7: not less than 6 μm and less than 7 μm

TABLE 1

| | TiC (wt %) | VOLUME RESISTIVITY VALUE (Ω·cm) | CRYSTAL STRUCTURE | ROTATION TEST | CLEARANCE $G_{23}$ (μm) | | | | | | | COMPREHENSIVE EVALUATION |
|---|---|---|---|---|---|---|---|---|---|---|---|---|
| | | | | | 0.7–1 | 1–2 | 2–3 | 3–4 | 4–5 | 5–6 | 6–7 | |
| COMPARATIVE EXAMPLE 1 | 1 | $10^{13}$ | ○ | SPARK DISCHARGES | X | X | ○ | ○ | ○ | ○ | ○ | X |
| | | | | $R_a$ | X | X | X | X | X | X | X | |
| COMPARATIVE EXAMPLE 2 | 3 | $10^{12.8}$ | ○ | SPARK DISCHARGES | X | X | ○ | ○ | ○ | ○ | ○ | X |
| | | | | $R_a$ | X | X | X | X | ○ | ○ | ○ | |
| EXAMPLE 1 | 5 | $10^{12.0}$ | ○ | SPARK DISCHARGES | ○ | ○ | ○ | ○ | ○ | ○ | ○ | ○ |
| | | | | $R_a$ | ○ | ○ | ○ | ○ | ○ | ◎ | ◎ | |
| EXAMPLE 2 | 7 | $10^{11.2}$ | ○ | SPARK DISCHARGES | ○ | ○ | ○ | ○ | ○ | ○ | ○ | ○ |
| | | | | $R_a$ | ○ | ○ | ○ | ◎ | ◎ | ◎ | ◎ | |
| EXAMPLE 3 | 10 | $10^{10.6}$ | ○ | SPARK DISCHARGES | ○ | ○ | ○ | ○ | ○ | ○ | ○ | ◎ |
| | | | | $R_a$ | ◎ | ◎ | ◎ | ◎ | ◎ | ◎ | ◎ | |
| EXAMPLE 4 | 13 | $10^{10.1}$ | ○ | SPARK DISCHARGES | ○ | ○ | ○ | ○ | ○ | ○ | ○ | ◎ |
| | | | | $R_a$ | ◎ | ◎ | ◎ | ◎ | ◎ | ◎ | ◎ | |
| EXAMPLE 5 | 15 | $10^{9.0}$ | ○ | SPARK DISCHARGES | ○ | ○ | ○ | ○ | ○ | ○ | ○ | ◎ |
| | | | | $R_a$ | ◎ | ◎ | ◎ | ◎ | ◎ | ◎ | ◎ | |

TABLE 2

| | TiC (wt %) | VOLUME RESISTIVIT VALUE (Ω·cm) | CRYSTAL STRUCTURE | ROTATION TEST | CLEARANCE $G_{23}$ (μm) | | | | | | | COMPREHENSIVE EVALUATION |
|---|---|---|---|---|---|---|---|---|---|---|---|---|
| | | | | | 0.7–1 | 1–2 | 2–3 | 3–4 | 4–5 | 5–6 | 6–7 | |
| EXAMPLE 6 | 17 | $10^{7.0}$ | ○ | SPARK DISCHARGES | ○ | ○ | ○ | ○ | ○ | ○ | ○ | ◎ |
| | | | | $R_a$ | ◎ | ◎ | ◎ | ◎ | ◎ | ◎ | ◎ | |

TABLE 2-continued

| | TiC (wt %) | VOLUME RESISTIVITY VALUE (Ω·cm) | CRYSTAL STRUCTURE | ROTATION TEST | CLEARANCE $G_{23}$ (μm) | | | | | | | COMPREHENSIVE EVALUATION |
|---|---|---|---|---|---|---|---|---|---|---|---|---|
| | | | | | 0.7–1 | 1–2 | 2–3 | 3–4 | 4–5 | 5–6 | 6–7 | |
| EXAMPLE 7 | 20 | $10^{6.1}$ | ○ | SPARK DISCHARGES | ○ | ○ | ○ | ○ | ○ | ○ | ○ | ○ |
| | | | | $R_a$ | ○ | ○ | ⊙ | ⊙ | ⊙ | ⊙ | ⊙ | |
| COMPARATIVE EXAMPLE 3 | 23 | $10^{5.5}$ | ○ | SPARK DISCHARGES | X | X | X | X | X | ○ | ○ | X |
| | | | | $R_a$ | ○ | ○ | ○ | ○ | ○ | ○ | ○ | |
| COMPARATIVE EXAMPLE 4 | 25 | $10^{3}$ | ○ | SPARK DISCHARGES | X | X | X | X | X | X | ○ | X |
| | | | | $R_a$ | ○ | ○ | ○ | ○ | ○ | ○ | ○ | |
| COMPARATIVE EXAMPLE 5 | 27 | $10^{-1}$ | ○ | SPARK DISCHARGES | X | X | X | X | X | X | X | X |
| | | | | $R_a$ | ○ | ○ | ○ | ○ | ○ | ○ | ○ | |
| COMPARATIVE EXAMPLE 6 | 30 | $10^{-2}$ | ○ | SPARK DISCHARGES | X | X | X | X | X | X | X | X |
| | | | | $R_a$ | ○ | ○ | ○ | ○ | ○ | ○ | ○ | |

TABLE 3

| | TiC (wt %) | VOLUME RESISTIVITY VALUE (Ω·cm) | CRYSTAL STRUCTURE | ROTATION TEST | CLEARANCE $G_{23}$ (μm) | | | | | | | COMPREHENSIVE EVALUATION |
|---|---|---|---|---|---|---|---|---|---|---|---|---|
| | | | | | 0.7–1 | 1–2 | 2–3 | 3–4 | 4–5 | 5–6 | 6–7 | |
| COMPARATIVE EXAMPLE 7 | 5 | $10^{11.6}$ | X | SPARK DISCHARGES | ○ | ○ | ○ | ○ | ○ | ○ | ○ | X |
| | | | | $R_a$ | X | X | ○ | ○ | ⊙ | ⊙ | ⊙ | |
| COMPARATIVE EXAMPLE 8 | 7 | $10^{11.2}$ | X | SPARK DISCHARGES | ○ | ○ | ○ | ○ | ○ | ○ | ○ | X |
| | | | | $R_a$ | X | X | ○ | ○ | ○ | ○ | ⊙ | |
| COMPARATIVE EXAMPLE 9 | 10 | $10^{10.6}$ | X | SPARK DISCHARGES | ○ | ○ | ○ | ○ | ○ | ○ | ○ | X |
| | | | | $R_a$ | X | X | X | ○ | ○ | ○ | ○ | |
| COMPARATIVE EXAMPLE 10 | 13 | $10^{10.1}$ | X | SPARK DISCHARGES | ○ | ○ | ○ | ○ | ○ | ○ | ○ | X |
| | | | | $R_a$ | X | X | X | ○ | ○ | ○ | ○ | |
| COMPARATIVE EXAMPLE 11 | 15 | $10^{9.0}$ | X | SPARK DISCHARGES | ○ | ○ | ○ | ○ | ○ | ○ | ○ | X |
| | | | | $R_a$ | X | X | X | ○ | ○ | ○ | ○ | |
| COMPARATIVE EXAMPLE 12 | 17 | $10^{7.4}$ | X | SPARK DISCHARGES | ○ | ○ | ○ | ○ | ○ | ○ | ○ | X |
| | | | | $R_a$ | X | X | X | X | ○ | ○ | ○ | |
| COMPARATIVE EXAMPLE 13 | 19 | $10^{6.1}$ | X | SPARK DISCHARGES | ○ | ○ | ○ | ○ | ○ | ○ | ○ | X |
| | | | | $R_a$ | X | X | X | ○ | ○ | ○ | ○ | |

As can be seen from the results in the comparative examples 1 and 2 in the tables, when the ceramics had the crystal structure shown in FIG. 5, but the content of TiC was less than 5 mass %, the effect of providing the conductive properties of TiC could not be obtained, so that the volume resistivity value thereof exceeded $10^{12}$ Ω·cm, and spark discharges by charging were liable to be induced. Particularly, the effect of improving wear resistance by the crystal grains of TiC included in the crystal grains of $Al_2O_3$ could not be obtained, so that the surface roughness was increased.

As can be seen from the results in the comparative examples 3 to 6, when the ceramics had the crystal structure shown in FIG. 5, but the content of TiC exceeded 20 mass %, the conductive properties thereof were too high, so that the volume resistivity value thereof was not more than $10^6$ Ω·cm, and spark discharges were liable to be induced.

Furthermore, as can be seen from the results in the comparative examples 7 to 13, when the ceramics did not have the crystal structure shown in FIG. 5, and the crystal grains of TiC were not included in the crystal grains of $Al_2O_3$, the surface roughness is increased because flaws and the like were developed by friction even if the content of TiC was within a range of 5 to 20 mass % and the volume resistivity value thereof was within a range of more than $10^6$ Ω·cm and not more than $10^{12}$ Ω·cm.

On the other hand, it was confirmed from the results in the examples 1 to 7 that if ceramics had the crystal structure shown in FIG. 5, and the content of TiC was within a range of 5 to 20 mass %, proper conductive properties were provided to the ceramics by TiC, to adjust the volume resistivity value thereof in a range of more than $10^6$ Ω·cm and not less than $10^{12}$ Ω·cm, thereby making it possible to reliably prevent spark discharges from being induced, and wear resistance was improved by the crystal grains of TiC included in the crystal grains of $Al_2O_3$, thereby making it possible to prevent the surface roughness from being increased due to flaws or the like developed by friction.

Examples 8 and 9

After the sliding surfaces 2a and 3c of the same shaft 2 and sleeve 3 as those manufactured in the examples 1 and 7 were finished to mirror surfaces, the shaft 2 and the sleeve 3, together with water and an abrasive (White Alundum), were put into a ballel, and were rotated for one hour. When the surface shapes of the sliding surfaces 2a and 3c that have been subjected to the foregoing treatment were measured using an atomic force microscope (AFM), it was confirmed that the crystal grains 41 and 42 of TiC were projected from the sliding surfaces 2a and 3c defined by the surface of the crystal grains 40 of $Al_2O_3$, as shown in FIG. 8. When the surface shapes of the sliding surfaces 2a and 3c that have not been subjected to the foregoing treatment were measured in the same manner, it could not be confirmed that the crystal grains of TiC were projected.

The same test as the foregoing was conducted with respect to the examples 8 and 9. A clearance $G_{23}$ created between the respective sliding surfaces 2a and 3c, opposed to each other, of the shaft 2 and the sleeve 3 was set to not less than 4 μm and less than 5 μm. Results, together with the results in the examples 1 and 7, are shown in Table 4.

TABLE 4

| | TiC (WT %) | VOLUME RESISTIVITY-VALUE (Ω · CM) | PROJECTION OF TiC | ROTATION TEST | | COMPREHENSIVE EVALUATION |
|---|---|---|---|---|---|---|
| EXAMPLE 1 | 5 | $10^{12.0}$ | NO | SPARK DISCHARGES | ○ | ○ |
| | | | | $R_a$ | ○ | |
| EXAMPLE 8 | 5 | $10^{12.0}$ | YES | SPARK DISCHARGES | ○ | ⊚ |
| | | | | $R_a$ | ⊚ | |
| EXAMPLE 7 | 20 | $10^{6.1}$ | NO | SPARK DISCHARGES | ○ | ○ |
| | | | | $R_a$ | ⊚ | |
| EXAMPLE 9 | 20 | $10^{6.1}$ | YES | SPARK DISCHARGES | ○ | ⊚ |
| | | | | $R_a$ | ⊚ | |

It was confirmed from Table 4 that when the crystal grains of TiC were projected, the surface roughness due to flaws and the like formed by friction can be more reliably prevented from being increased.

Examples 10 to 12, Comparative Example 14

The same shaft 2 and flange 4 as those manufactured in the example 1 and a sleeve 3 composed of ceramics having a small volume resistivity value, whose difference from the volume resistivity values of the shaft 2 and the flange 4 was a value shown in Table 5 by adjusting the content of TiC, to constitute a fluid dynamic pressure bearing 1. A clearance $G_{23}$ created between the respective sliding surfaces 2a and 3c, opposed to each other, of the shaft 2 and the sleeve 3 was set to 2 μm. The rotation test (I) was conducted. Results, together with the results in the example 1, are shown in Table 5.

TABLE 5

| | Difference in volume resistivity value (Ω · cm) | Spark discharges |
|---|---|---|
| Example 1 | 0 | ○ |
| Example 10 | $10^{1.7}$ | ○ |
| Example 11 | $10^{3.6}$ | ○ |
| Example 12 | $10^{5}$ | ○ |
| Comparative exampe 14 | $10^{5.5}$ | X |

It was confirmed from Table 5 that when the difference in the volume resistivity value between ceramics forming the shaft 2 and ceramics forming the sleeve 3 was not more than $10^5$ Ω·cm, spark discharges could be prevented from being induced.

Examples 13 to 18, Comparative Examples 15 to 18

Three types of grains, described below, and each of components MgO, $ZrO_2$, $Y_2O_3$, and $Yb_2O_3$ serving as a sintering aids were mixed, to prepare a mixture in which ceramics forming the shaft 2, the sleeve 3, and the flange 4 in the fluid dynamic pressure bearing 1 shown in FIGS. 1 to 4.

Grains of $Al_2O_3$: an average grain diameter of 0.5 μm, a purity of not less than 99%

Grains of TiC having a large grain diameter: an average grain diameter of 3.5 μm, a purity of not less than 98%

Grains of TiC having a small grain diameter: an average grain diameter of 0.5 μm, a purity of not less than 98%

The mixture ratio of the two types of grains of TiC was set to 50/50 in terms of the ratio $W_1/W_2$ of the mass $W_1$ of the grains of TiC having a large grain diameter to the mass $W_2$ Of the grains of TiC having a small grain diameter.

The mixture ratio of the grains of $Al_2O_3$ and the two types of grains of TiC was so adjusted that the content (mass %) of the total amount of the two types of grains of TiC in the total amount of the three types of grains was a value shown in Table 6.

The mixture ratio of the sintering aids was so adjusted that the total amount of the above-mentioned components was 0.1 to 15 parts by mass per 100 parts by mass of the total amount of the three types of grains. More specifically, the higher the mixture ratio of the two types of grains of TiC that were higher in sintering temperature and were lower in sintering speed than the grains of $Al_2O_3$ was, the larger the amount of the sintering aids to be mixed was.

A solvent was added to the mixture, an aggregate of the grains was ground while mixing them using a mill, to prepare a slurry, and a resin binder was added to the slurry, followed by drying, to prepare raw material powder of ceramics.

Figure 9:
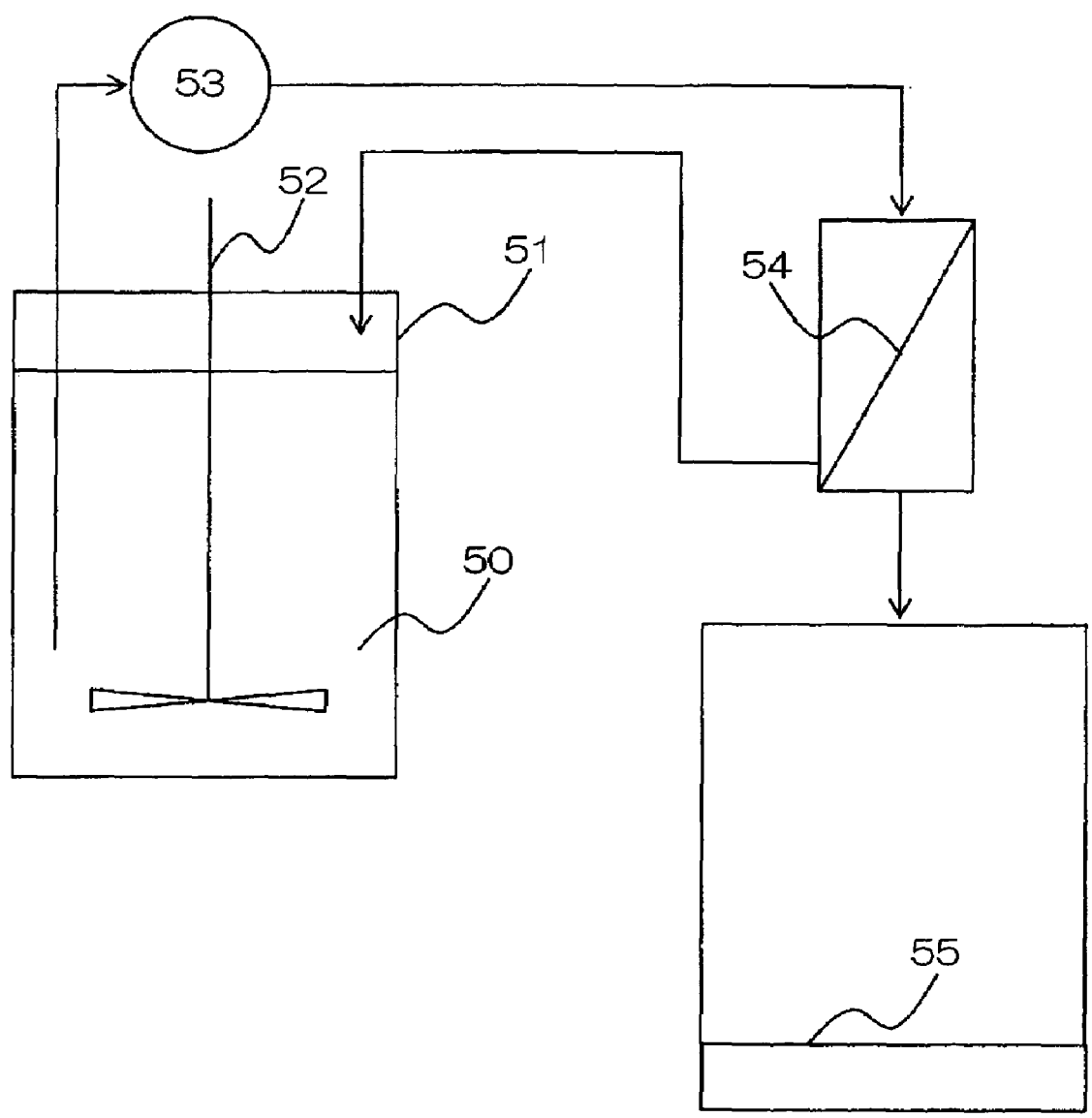
FIG. 9 is a schematic view showing an example of a ultrafiltration device used for adjusting the grain diameter of grains included in a slurry in the example.

In the examples 14, 16, and 18 in Table 6, a solvent was added to the prepared slurry and was diluted by four times, the diluted slurry 50 was filtered using a ultrafiltration device shown in FIG. 9, and a resin binder was added thereto, followed by drying, to prepare raw material powder.

The ultrafiltration device is a device for repeating operations for operating a solution feeding pump 53 while agitating the diluted slurry 50 using an agitator 52 within an agitating tank 51 to feed the slurry 50 to an ultrafiltration membrane device 54, passing the slurry 50 through the ultrafiltration membrane device 54, to remove the slurry 55 containing grains having a grain diameter of less than 0.2 µm, and then reflowing the slurry 50 to the agitating tank 51. When the slurry 50 passes through the ultrafiltration membrane device 54, not only the grains having a grain diameter of less than 0.2 µm but also a part of the solvent was removed as the slurry 55. Thus, the slurry 50 reflowed within the ultrafiltration device was gradually condensed. Therefore, the reflow was repeated until the concentration of the diluted slurry 50 became the original concentration before the dilution, to remove the grains having a grain diameter of less than 0.2 µm.

Figure 10:
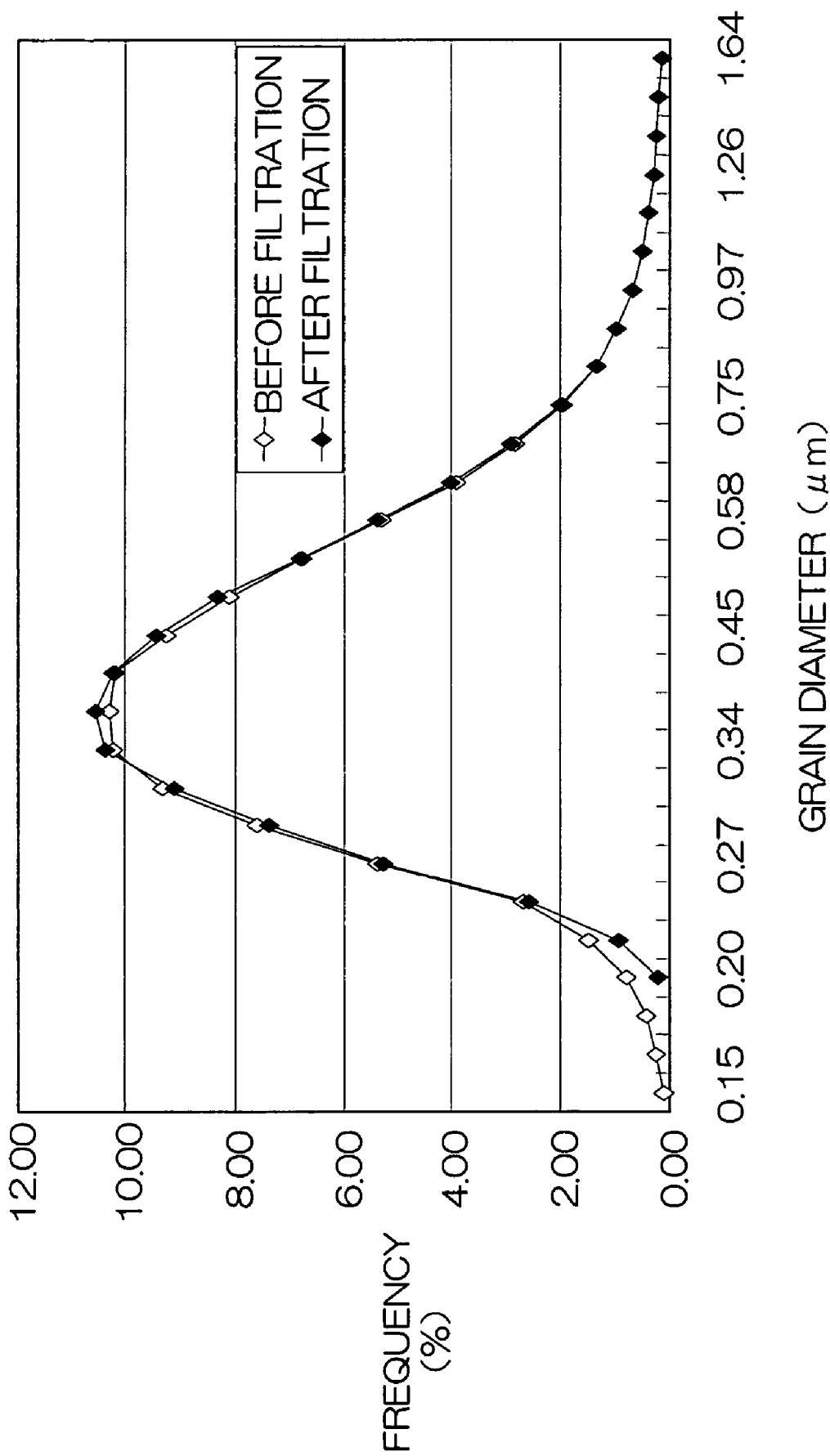
FIG. 10 is a graph showing the respective grain diameter distributions of grains included in a slurry before and after ultrafiltration treatment.
Figure 11:
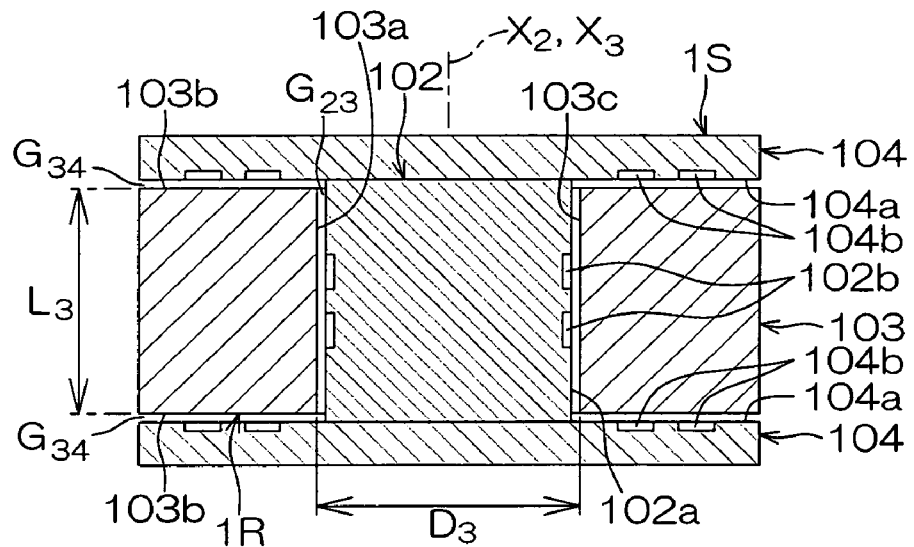
FIG. 11 is a cross-sectional view showing a state where a rotating member is rotated in a conventional fluid dynamic pressure bearing.
Figure 12:
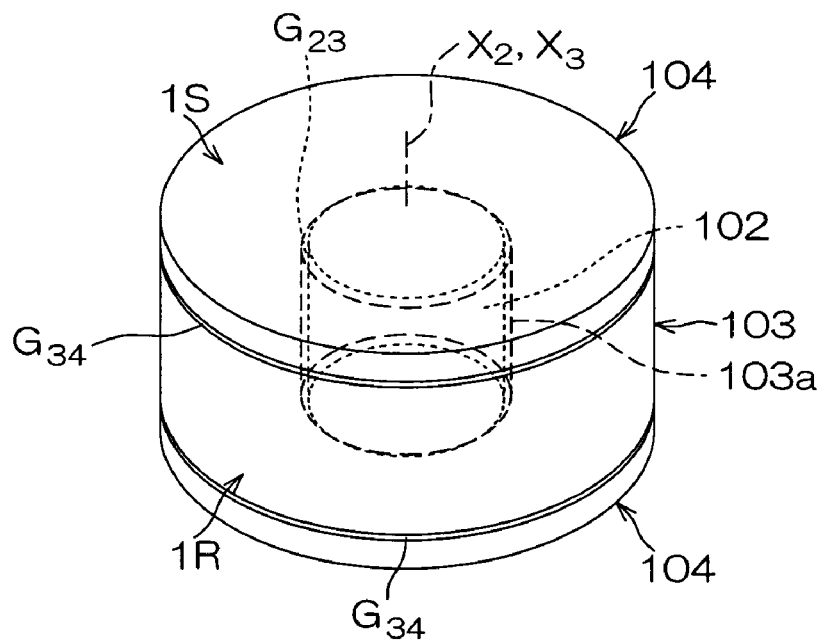
FIG. 12 is a perspective view showing the appearance of the fluid dynamic pressure bearing in a state shown in FIG. 11.
Figure 13:
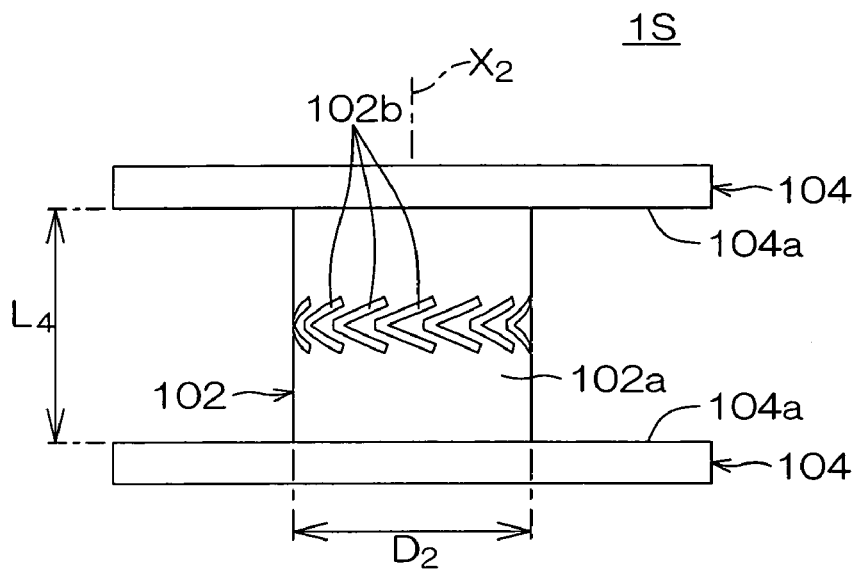
FIG. 13 is a front view showing the appearance of a fixed member comprising a shaft and flanges in the fluid dynamic pressure bearing.
Figure 14:
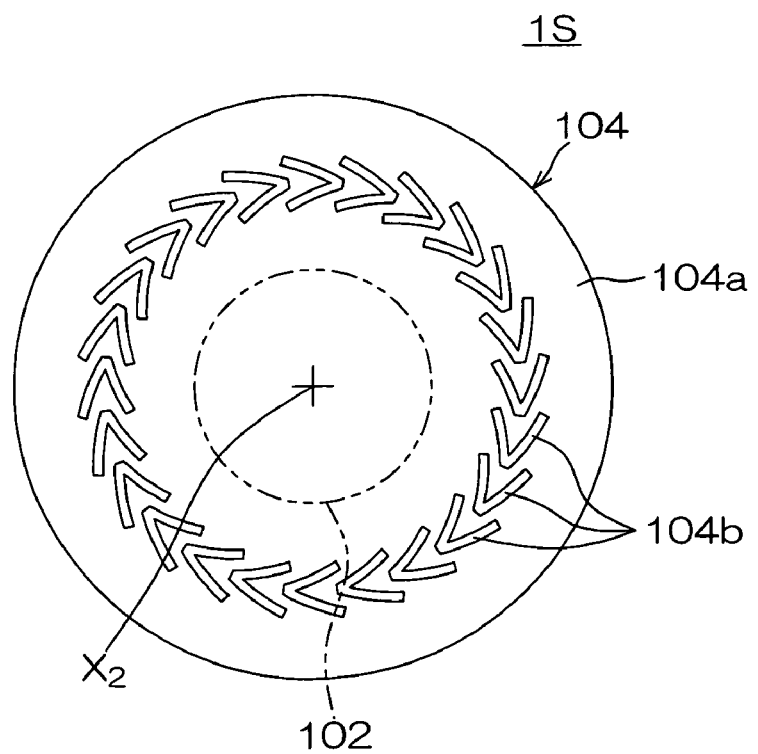
FIG. 14 is a plan view showing a sliding surface of a flange.

FIG. 10 is a graph showing results obtained by measuring the grain size distributions of the grains included in the slurry before and after performing filtration treatment in the example 16.

As shown in FIG. 10, components having a grain diameter of less than 0.2 µm could be cut without almost changing the distribution of components each having a grain diameter of not less than 0.2 µm by performing filtration treatment. Selected and used as a ultrafiltration membrane of the ultrafiltration device 56 may be ones that differ in opening depending on the composition, the quality, and so forth of the slurry.

After the raw material powder prepared in the foregoing manner was then formed into the shapes of the shaft 2, the sleeve 3, and the flange 4 using a mechanical press, was put into a vacuum furnace, and was fired at a temperature of 1600 to 1800° C., surfaces including their sliding surfaces were then finished to mirror surfaces, to manufacture the members 2 to 4.

On the sliding surface 2a serving as an outer peripheral surface of the shaft 2 and the sliding surface 4a serving as a side surface of the flange 4, a plurality of dynamic pressure creation grooves 2b and 4b in a herringbone shape were respectively formed by blast processing.

The following tests were conducted with respect to each of the members 2 to 4 manufactured in the examples and the comparative examples, to evaluate the properties thereof.

Observation of Crystal Structure:

A measuring sample was cut out from the shaft 2, to take a photograph at ×20,000 magnification using a TEM. It was confirmed whether or not the taken photograph included crystal grains having a grain diameter of less than 0.2 µm. The photograph was subjected to image analysis using an image analyzer (LUZEX FS manufactured by Nireco Corp.), to find an occupancy rate (%) per unit area of the crystal grains having a grain diameter of less than 0.2 µm.

Measurement of Average Crystal Grain Diameter:

A measuring sample was cut out from the shaft 2, to take a photograph at ×2,000 magnification using a metallurgical microscope. An average crystal grain diameter (µm) was calculated by a code method from the taken photograph.

Measurement of Fracture Toughness Value:

A measuring sample was cut out from the shaft 2, to find a fracture toughness value K1c ($MPa \cdot m^{1/2}$) by an Indentation Fracture method using a Vickers hardness tester, that is, on the basis of an equation printed in Japanese Industrial Standards JIS R1607:1995 "Testing methods for fracture toughness of fine ceramics" from an indentation and a crack length created by pressing a Vickers indenter into the sample under conditions of a load of 98.065N.

Measurement of Thermal Conductivity:

A measuring sample was cut out from the shaft 2, to measure a thermal conductivity (W/m·K) by a laser flash method.

Chipping Test:

The same raw material powder as those used in the examples and the comparative examples was formed under the same conditions, was fired, was formed into the shape of a pillar measuring 3 mm in height by 4 mm in width by 30 mm in length, and was polished using a tin panel until the surface thereof is changed into a mirror surface to prepare a measuring sample.

The sample was then cut in a direction parallel to the direction of the length of the pillar using a diamond wheel (resin #325, 110 mm in diameter by 1 mm in thickness) under conditions of the number of revolutions of 5500 rpm and a feed speed of 40 mm/min., and situations where chipping is generated was then evaluated.

That is, a measuring line having a length of 500 µm was set at an arbitrary position of a cut surface of the sample, the lengths on the measuring line of chipped portions existing within a range of the measuring line were measured, the five chipped portions were selected in descending order, beginning with the longest chipped portion, and an average of the lengths of the chipped portions on the measuring line was found. Situations where chipping was generated were evaluated by the following criteria.

◎: The average value was less than 100 µm. "excellent"

○: The average value was not less than 100 µm and less than 150 µm. "very good"

Δ: The average value was not less than 150 µm and less than 200 µm. "good"

X: The average value was not less than 200 µm. "bad"

Machining Test:

The same raw material powder as those used in the examples and the comparative examples was formed under the same conditions, was fired, and was formed into the shape of a disk having a diameter of 76 mm and a thickness of 4 mm, and its surface was polished, to prepare a measuring sample.

The sample was then cut in the direction of the diameter of the disk using a diamond wheel (resin #325, 110 mm in diameter by 1 mm in thickness) under conditions of the number of revolutions of 5500 rpm and a feed speed of 100 mm/min of the wheel. At this time, a load current value of a motor for rotating the diamond wheel was measured, to find grinding resistance value (N). It was evaluated whether or not machining was easy on the basis of the grinding resistance value by the following criteria:

◎: The grinding resistance value was not more than 0.98 N. "excellent"

◯: The grinding resistance value was more than 0.98 N and not more than 1.96 N. "very good"

Δ: The grinding resistance value was more than 1.96 N and not more than 2.94 N. "good"

X: The grinding resistance value was more than 2.94 N. "bad"

The foregoing results are shown in Table 6.

TABLE 6

|  | TiC (wt %) | VOLUME RESISTIVITY VALUE (Ω·cm) | ULTRAFILTRATION | AVERAGE CRYSTAL GRAIN DIAMETER (μm) | CRYSTALS HAVING GRAIN DIAMETER OF LESS THAN 0.2 μm | | FRACTURE TOUGHNESS VALUE (MPa·m$^{1/2}$) | THERMAL CONDUCTIVITY (W/m·K) | CHIPPING | MACHINING |
|---|---|---|---|---|---|---|---|---|---|---|
|  |  |  |  |  | EXISTENCE | OCCUPANCY RATE (%) |  |  |  |  |
| COMPARATIVE EXAMPLE 15 | 1 | $10^{13}$ | NO | 5.5 | YES | 0.6 | 2.9 | 32 | X | X |
| COMPARATIVE EXAMPLE 16 | 3 | $10^{12.8}$ | NO | 5.3 | YES | 0.5 | 2.9 | 29 | X | Δ |
| EXAMPLE 13 | 5 | $10^{11.8}$ | NO | 5 | YES | 0.8 | 3.1 | 24 | Δ | ◯ |
| EXAMPLE 14 | 5 | $10^{12.0}$ | YES | 4.9 | NO | 0 | 3.2 | 26 | ◯ | ◎ |
| EXAMPLE 15 | 13 | $10^{10.1}$ | NO | 3.6 | YES | 1.1 | 3.2 | 22 | ◯ | ◯ |
| EXAMPLE 16 | 13 | $10^{10.2}$ | YES | 3.4 | NO | 0 | 3.4 | 24 | ◎ | ◎ |
| EXAMPLE 17 | 20 | $10^{6.1}$ | NO | 1.7 | YES | 1.5 | 3.5 | 20 | ◯ | ◯ |
| EXAMPLE 18 | 20 | $10^{6.2}$ | YES | 1.4 | NO | 0 | 3.7 | 23 | ◎ | ◎ |
| COMPARATIVE EXAMPLE 17 | 21 | $10^{5.5}$ | NO | 0.9 | YES | 1.5 | 3.7 | 20 | ◯ | ◯ |
| COMPARATIVE EXAMPLE 18 | 30 | $10^{-2}$ | NO | 0.8 | YES | 1.7 | 3.8 | 18 | X | X |

As can be seen from the results in the comparative examples 15 and 16 in Table 6, when the content of TiC was less than 5 mass % and the average crystal grain diameter thereof exceeded 5.0 μm, the fracture toughness value was small, chipping was easily generated, and machining was not easy. As can be seen from the results in the comparative examples 17 and 18, when the content of TiC exceeded 20 mass % and the average crystal grain diameter thereof was less than 1.0 μm, the fracture toughness value was large, chipping was liable to be generated, and machining was not easy.

On the other hand, as can be seen from the results in the examples 13 to 18, when the content of TiC was within a range of 5 to 20 mass % and the average crystal grain diameter thereof was 1.0 to 5.0 μm, the fracture toughness value had a good value, chipping was not easily generated, and machining was easy.

As can be seen from comparison among the examples, in the examples 14, 16 and 18 in which crystal grains having a grain diameter of less than 0.2 μm were not contained by subjecting the slurry to ultrafiltration treatment to remove the grains having a grain diameter of less than 0.2 μm, the fracture toughness and the thermal conductivity were higher, chipping was difficult to generate, and machining was easier, as compared with those in the examples 13, 15 and 17 in which the ultrafiltration treatment was not performed.

The present application corresponds to Japanese patent application No. 2004-160090 filed with the Japanese Patent Office on May 28, 2004 and Japanese patent application No. 2004-281698 filed with the Japanese Patent Office on Sep. 28, 2004, the disclosures of which are hereinto incorporated by reference.

The invention claimed is:

1. A sliding device comprising at least two sliding members respectively having sliding surfaces opposed to each other for creating dynamic pressure in a fluid, characterized in that at least the respective sliding surfaces of the sliding members are formed of ceramics containing crystal grains of $Al_2O_3$, crystal grains of TiC contained in the crystal grains of $Al_2O_3$, and crystal grains of TiC existing independently of the crystal grains of $Al_2O_3$, and having a TiC content of 5 to 20 mass % in the total amount of $Al_2O_3$ and TiC, and the volume resistivity value $R_1$ of the ceramics forming one of the sliding surfaces and the volume resistivity value $R_2$ of the ceramics forming the other sliding surface are within a range simultaneously satisfying equations (1) to (3):

$$10^6 \, \Omega\cdot cm < R_1 \leq 10^{12} \, \Omega\cdot cm \tag{1}$$

$$10^6 \, \Omega\cdot cm < R_2 \leq 10^{12} \, \Omega\cdot cm \tag{2}$$

$$|R_1 - R_2| \leq 10^5 \, \Omega\cdot cm \tag{3.}$$

2. The sliding device according to claim 1, characterized in that the sliding surface is defined by a surface of the crystal grains of $Al_2O_3$ in the ceramics, and at least a part of at least the crystal grains of TiC existing independently of the crystal grains of $Al_2O_3$ out of the crystal grains of TiC existing on the sliding surface is projected from the sliding surface.

3. The sliding device according to claim 2, characterized in that at least a part of the crystal grains of TiC contained in the crystal grains of $Al_2O_3$ is also projected from the sliding surface, and the projection height $H_1$ thereof and the projection height $H_2$ of the crystal grains of TiC existing independently of the crystal grains of $Al_2O_3$ from the sliding surface are within a range satisfying an equation (4):

$$H_1 \leq H_2 \tag{4.}$$

4. The sliding device according to claim 2, characterized in that the maximum crystal grain diameter of the crystal grains of TiC contained in the crystal grains of $Al_2O_3$ is less than 1.0 μm, and the average crystal grain diameter of the crystal grains of TiC existing independently of the crystal grains of $Al_2O_3$ is 1.0 to 10.0 μm.

5. The sliding device according to claim 1, characterized in that the average crystal grain diameter of all the crystal grains composing the ceramics is 1.0 to 5.0 μm, and the minimum crystal grain diameter thereof is not less than 0.2 μm.

6. A fluid dynamic pressure bearing characterized in that each of the sliding members composing the sliding device according to claim 1 is formed in a shape relatively rotatable around a common axis in a state where a clearance is created by dynamic pressure in a fluid between the sliding surfaces opposed to each other.

7. A motor characterized by comprising the fluid dynamic pressure bearing according to claim 6, a clearance between the two sliding surfaces of the fluid dynamic pressure bearing being shielded from the air, and the clearance being filled with inert gas or gas substantially containing no water as a fluid.

* * * * *